US012632310B1

(12) United States Patent
Bhat et al.

(10) Patent No.: US 12,632,310 B1
(45) Date of Patent: May 19, 2026

(54) DIVIDING ACTION REQUESTS FOR EXECUTION BY MULTIPLE ARTIFICIAL INTELLIGENCE AGENTS

(71) Applicant: Citibank, N.A., New York, NY (US)

(72) Inventors: Ganesh Prasad Bhat, West Orange, NJ (US); Ramee S. Karthikeyan, Monmouth Junction, NJ (US); Nikhil Arunkumar Joshi, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/327,733

(22) Filed: Sep. 12, 2025

(51) Int. Cl.
G06F 9/50 (2006.01)
G06Q 10/0631 (2023.01)

(52) U.S. Cl.
CPC ..... G06F 9/5038 (2013.01); G06Q 10/06316 (2013.01)

(58) Field of Classification Search
CPC ........................ G06F 9/5038; G06Q 10/06316
See application file for complete search history.

(56) References Cited

U.S. PATENT DOCUMENTS

2025/0117727 A1* 4/2025 Osborne .......... G06Q 10/06316
2025/0232239 A1* 7/2025 Kelsey ............. G06Q 10/06316
2025/0259085 A1* 8/2025 Crabtree ................. G06N 5/01

* cited by examiner

*Primary Examiner* — Kenneth Tang
(74) *Attorney, Agent, or Firm* — Perkins Coie LLP; Sumedha Ahuja; Willa Wu

(57) ABSTRACT

Methods and systems for dividing computational tasks across multiple artificial intelligence agents are disclosed herein. A routing system may receive requests for executing computational functions that include function execution instructions and request data indicators. The system may detect multiple sets of boundaries within the request data, with each boundary set corresponds to the computational function. Data fragments may be generated using these boundaries, with each fragment overlapping neighboring fragments to minimize semantic disruption. An execution map may be created that assigns sub-functions to different artificial intelligence agents based on corresponding sub-functions for each data fragment. A dependency graph may be generated to indicate the execution order of sub-functions. The system may transmit data fragments and metadata to artificial intelligence agents based on the dependency graph and execution map. Multiple outputs from the artificial intelligence agents may be aggregated and transmitted as final results.

20 Claims, 9 Drawing Sheets

900

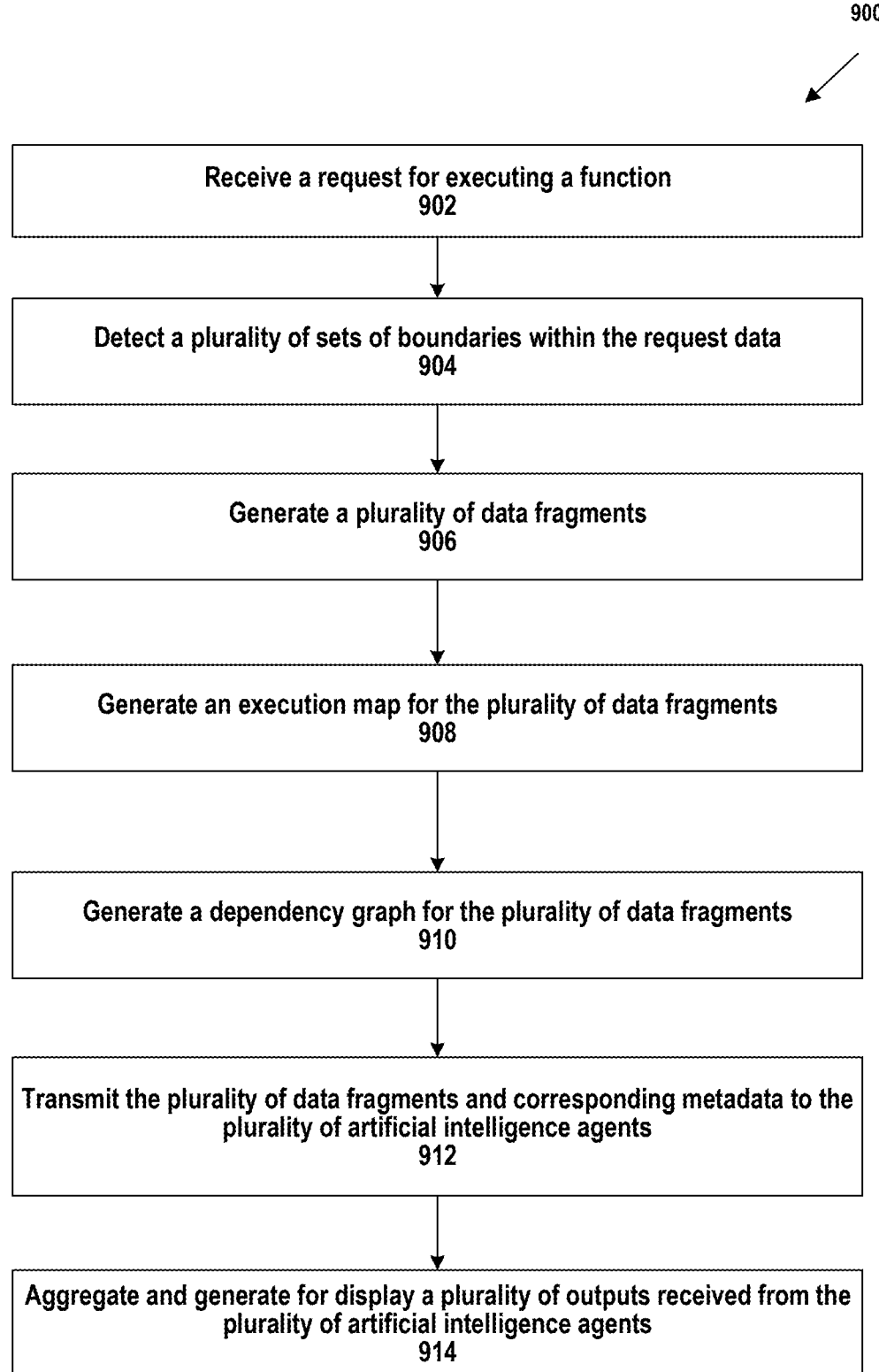

Receive a request for executing a function
902

Detect a plurality of sets of boundaries within the request data
904

Generate a plurality of data fragments
906

Generate an execution map for the plurality of data fragments
908

Generate a dependency graph for the plurality of data fragments
910

Transmit the plurality of data fragments and corresponding metadata to the plurality of artificial intelligence agents
912

Aggregate and generate for display a plurality of outputs received from the plurality of artificial intelligence agents
914

*FIG. 9*

DIVIDING ACTION REQUESTS FOR EXECUTION BY MULTIPLE ARTIFICIAL INTELLIGENCE AGENTS

BACKGROUND

Artificial intelligence systems have become increasingly sophisticated, with modern language models and AI agents capable of processing and analyzing complex textual data. However, these systems face fundamental limitations in how they process data. While some models can handle substantial amounts of text, many real-world applications involve documents, codebases, or datasets that exceed these processing limits. Distributing processing of computational tasks across multiple AI agents presents opportunities for improved efficiency and leveraging specialized capabilities. However, coordinating such distributed processing remains a challenge.

SUMMARY

Accordingly, disclosed herein are methods and systems that can intelligently decompose large computational tasks, route appropriate portions to suitable AI agents, and synthesize the results into coherent outputs that preserve the relationships and context of the original input. This approach can prevent loss of contextual information, disruption of semantic relationships, and reduced coherence across different segments of the processed content. Additionally, this approach may improve performance and accuracy as different AI models possess varying capabilities and specializations, with some excelling in general-purpose tasks while others are fine-tuned for specific domains such as finance, medicine, or legal analysis.

In some implementations, a routing system may be used to perform operations described herein. The routing system may receive a request for executing a computational function that may include function execution instructions and indicators corresponding to request data. The request data may be part of the request or may include one or more links to the requested data. Furthermore, the function execution instructions may be generated from The system detects multiple sets of boundaries within the request data, where each set of boundaries relates to the computational function. The routing system generates multiple data fragments using these boundaries, ensuring each fragment minimizes semantic disruption by overlapping with neighboring fragments. The system creates an execution map for the data fragments that assigns sub-functions to different artificial intelligence agents based on each fragment's corresponding sub-function. The routing system generates a dependency graph for the data fragments that shows the execution order of the sub-functions associated with each fragment. The system transmits the data fragments and their metadata to multiple artificial intelligence agents based on the dependency graph and execution map, where each agent has its own computer-executable operation set for autonomous execution on software applications. The routing system aggregates and transmits the outputs received from all the artificial intelligence agents.

According to an aspect of the present disclosure, the routing system may receive and process incoming computational requests. Specifically, the routing system may receive a request for executing a computational function that includes function execution instructions and indicators corresponding to request data associated with the computational function. For example, the request may be a large document analysis task with instructions for processing different sections using specialized AI models. In some implementations, the routing system may determine the computational function (e.g., a task) based on a received prompt. The routing system may also receive the request data within the request and/or the request may include one or more links to the request data.

The routing system may identify logical divisions (e.g., based on context) within the input data. Specifically, the routing system may detect multiple sets of boundaries within the request data. Each set of boundaries may be associated with the computational function. For example, the system may identify natural breaking points between different topics, sections, or content types within a document.

The routing system may create overlapping segments from the input data. Specifically, the routing system may generate multiple data fragments using the sets of boundaries, where each fragment minimizes semantic disruption by overlapping with neighboring fragments. For example, each fragment may share 10-20% of its content with adjacent fragments to maintain context continuity.

The routing system may implement disjointed boundaries to handle complex content structures where logical divisions do not follow sequential patterns within the request data. In some implementations, disjointed boundaries may allow the system to identify and group related content segments that are physically separated within the original document but share semantic relationships or thematic connections. For example, when processing a technical manual that contains procedural steps interspersed with safety warnings throughout different sections, the routing system may detect disjointed boundaries that group all safety-related content into cohesive fragments regardless of their original positions in the document. This approach may enable the system to create more semantically meaningful data fragments that preserve conceptual relationships while optimizing the assignment of specialized artificial intelligence agents based on content type rather than document structure.

The implementation of disjointed boundaries may provide enhanced flexibility in fragment generation by allowing the routing system to reorganize content based on functional relationships rather than linear document flow. In some cases, the boundary detection model may identify that certain topics or entities appear in multiple non-contiguous sections of the request data, and the system may create fragments that consolidate these related elements to improve processing efficiency and analytical coherence. For instance, when analyzing a legal contract that references specific clauses and definitions scattered throughout the document, the routing system may use disjointed boundaries to create fragments that combine all references to particular legal concepts, enabling domain-specific artificial intelligence agents to process complete contextual information about each concept rather than fragmented references. This approach may improve the accuracy of specialized processing while maintaining the dependency relationships established in the execution map and dependency graph.

The routing system may connect data fragments to corresponding sub-functions. Specifically, the routing system may generate an execution map for the data fragments that includes sub-functions assigned to one or more artificial intelligence agents. For example, each data fragment may have a corresponding sub-function that is to be executed on that data fragment. For example, technical sections may be routed to specialized technical AI models while narrative sections may go to general-purpose language models. Each data fragment (e.g., section) may include a corresponding set of instructions for the corresponding model.

The routing system may determine the order of processing operations. Specifically, the routing system may generate a dependency graph for the data fragments based on the sets of boundaries and corresponding fragments. The dependency graph may indicate execution order of the sub-functions associated with the data fragments. For example, the graph may show that certain fragments must be processed sequentially while others can be handled in parallel.

The routing system may distribute work to various AI agents/models. Specifically, the routing system may transmit the data fragments and corresponding metadata to the artificial intelligence agents based on the dependency graph and execution map. Each agent may have its own computer-executable operation set for autonomous execution on software applications. For example, fragments may be sent to appropriate AI models/agents based on their specializations, capabilities and/or context window capabilities.

The routing system may combine and deliver results. Specifically, the routing system may aggregate and transmit outputs received from the artificial intelligence agents. For example, the system may synthesize individual fragment results into a coherent final output while maintaining semantic relationships.

According to other aspects of the present disclosure, the routing system may include a context window optimization component. The context window optimization component may analyze detected boundaries and agent capabilities to determine optimal fragment sizes and assignments. The context window optimization component may maintain a capability database storing information about each artificial intelligence agent. This information may include maximum context window sizes, specialized processing capabilities, and performance metrics. For example, some agents may handle larger context windows of 32 k tokens while others may be limited to 8 k tokens.

In some implementations, the context window optimization component may analyze the detected boundaries using natural language processing techniques. The component may identify semantic units such as paragraphs, sections, or topically-related content blocks. The component may calculate token counts and complexity metrics for each potential fragment. The context window optimization component may match fragments to agent capabilities using a multi-step process. The component may first identify agents with appropriate specializations for the fragment content type. For example, technical content fragments may be matched with agents trained on technical documentation. The component may then filter the candidate agents based on context window constraints.

In some aspects, if a potential fragment exceeds an agent's context window size, the context window optimization component may implement fragment adjustment techniques. The component may identify alternative boundary points that preserve semantic coherence while reducing fragment size. The component may also analyze dependencies between fragments to determine if splitting the content would disrupt critical context.

In addition, the context window optimization component may employ optimization algorithms to balance multiple constraints. The component may consider factors such as fragment size, agent specialization, expected processing time, and load balancing across available agents. The component may generate multiple candidate fragmentation schemes and score them based on defined optimization criteria. In some implementations, the context window optimization component may dynamically adjust fragmentation during processing. The component may monitor agent performance and availability metrics in real-time. If an agent becomes unavailable or shows degraded performance, the component may recalculate fragment assignments and boundaries to redistribute work while maintaining processing efficiency.

In some implementations, the context window optimization component may also manage fragment overlap regions. The component may analyze semantic relationships to determine appropriate overlap sizes between adjacent fragments. The overlap regions may be adjusted based on content complexity and the capabilities of assigned agents. For example, more complex technical content may receive larger overlap regions to maintain context.

According to other aspects of the present disclosure, the routing system may include one or more of the following features. The system may use a topics AI model trained on a dataset to predict topics within input data and assign topics to boundary sets. The topics AI model may detect boundaries based on content type including narrative, technical, dialogue content, and/or other criteria. The system may track topics across fragments for reference coherence and overlap topics based on content complexity. In some implementations, the routing system may determine agent availability metrics and modify fragment sizes accordingly. In some implementations, the routing system may also use a graph generation model trained to identify parallel sub-functions and a path optimization model trained to optimize execution time based on availability. The routing system may also handle agent failures by generating updated execution paths, and may perform backpropagation of newly discovered information to refine earlier processing results.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

FIG. 9 is a flowchart of operations for dividing computational action requests for different artificial intelligence agents, in accordance with one or more embodiments of this disclosure.

DETAILED DESCRIPTION

Figure 1:
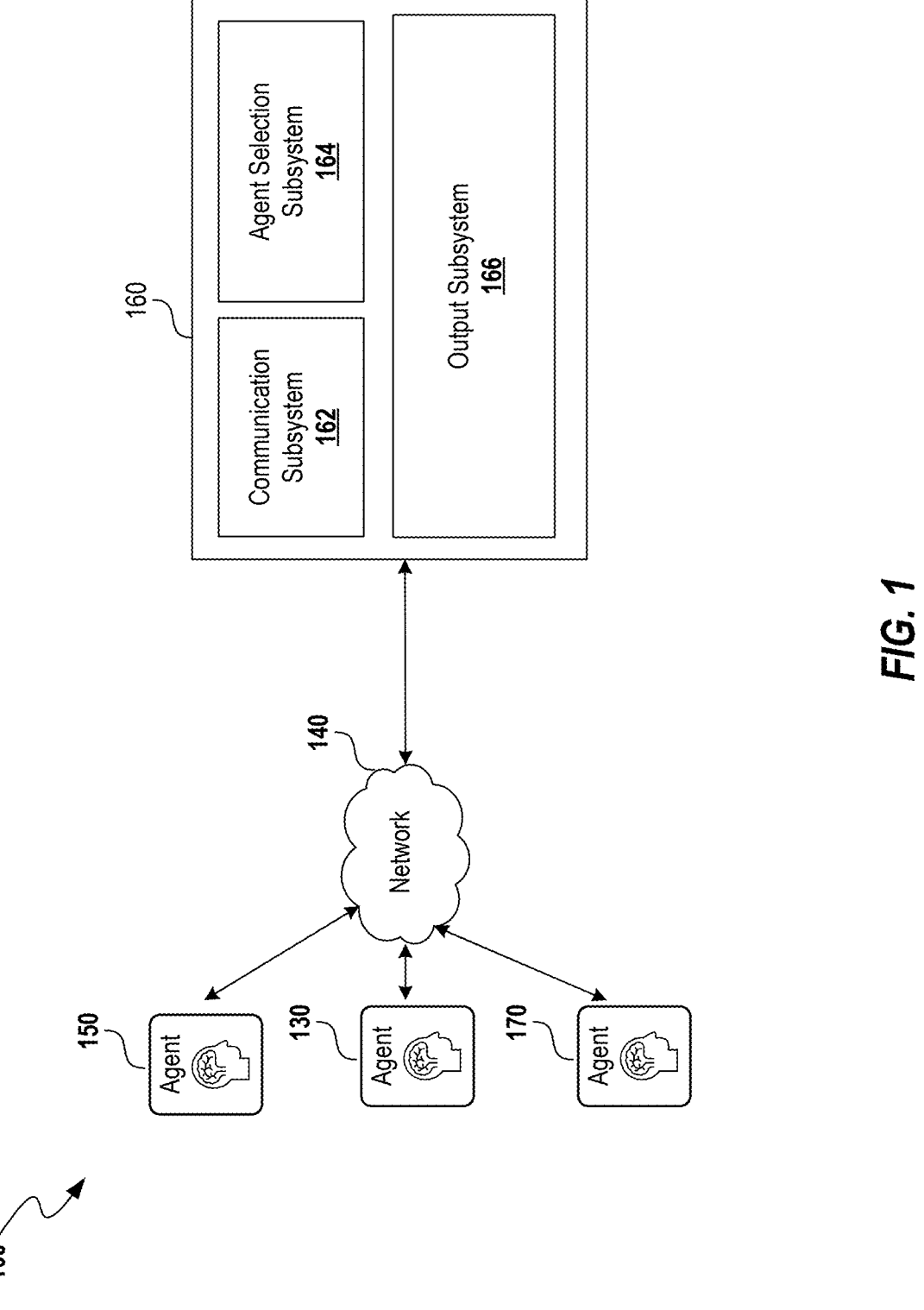
FIG. 1 shows an illustrative system for dividing computational action requests for different artificial intelligence agents, in accordance with one or more embodiments of this disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein. Furthermore, in the following description, for the purposes of explanation, numerous specific details are set forth in order to provide a thorough understanding of the disclosed embodiments. It will be appreciated, however, by those having skill in the art, that the embodiments may be practiced without these specific details or with an equivalent arrangement.

The present disclosure relates to a context-aware hierarchical task decomposition and routing system that addresses limitations of individual artificial intelligence models' context windows. Large-scale computational tasks often exceed the processing capacity of any single artificial intelligence model, creating challenges in maintaining semantic coherence while enabling efficient processing. The system may intelligently decompose large computational tasks and route the decomposed tasks to suitable artificial intelligence agents while preserving semantic relationships and contextual integrity. In some implementations, the system may coordinate multiple artificial intelligence agents with varying capabilities and context window sizes to process tasks that would otherwise be impossible for individual models to handle. The system may enable seamless integration of diverse artificial intelligence models, including general-purpose models and domain-specific fine-tuned models, optimizing task allocation based on each agent's capabilities and specialization. The disclosed system may have a number of components, as discussed below.

A Semantic Context Fragmenter may serve as a component that employs advanced natural language processing techniques to analyze input text and identify optimal fragmentation points. The fragmenter may understand the semantic structure of content rather than performing simple character or token-based splitting. In some cases, the fragmenter may implement dynamic boundary detection that adapts to different content types such as narrative, technical documentation, or dialogue formats. The fragmenter may also track entities across fragment boundaries to maintain reference coherence and may calculate intelligent overlap that varies based on content complexity. The fragmenter may generate metadata for each fragment, enabling downstream optimization processes and ensuring that semantic relationships are preserved during the decomposition process.

A Dependency Graph Generator may be a component that construct a directed acyclic graph representing the logical flow and dependencies between fragments. The generator may analyze relationships between fragments to create execution pathways that respect data dependencies while maximizing parallel processing opportunities. In some cases, the generator may identify parallelizable sub-tasks or sub-functions for concurrent execution and may perform analysis for execution time optimization. The generator may enable dynamic reordering based on agent availability and may provide alternative execution paths for failure recovery scenarios. The generator may implement cycle detection and prevention using topological sort with depth-first search algorithms to ensure the directed acyclic graph remains acyclic throughout the processing workflow.

As disclosed herein the term function or a computational function may mean a user query or a prompt for returning some type of information or data or performing a task or an action. The term task or action may be used interchangeably within this disclosure. As disclosed herein, the term sub-function may refer to a part or a portion of a function, a portion of an action, or a portion of a task. The term sub-function may be used interchangeably with the terms sub-action or sub-task.

A Context Overlap Manager may be a component that ensures information continuity by maintaining strategic overlaps between fragments, typically ranging from ten to twenty percent of fragment content. The overlap manager may provide context for pronouns and references that span across fragment boundaries, enabling coherent style and tone maintenance throughout the processing pipeline. In some implementations, the overlap manager may facilitate accurate entity resolution across boundaries and may support backpropagation of discovered information from later processing stages to earlier stages. The overlap manager may calculate overlap regions dynamically based on content complexity and semantic density, ensuring that contextual bridges maintain sufficient information for downstream processing while avoiding excessive redundancy.

A Parallel Execution Engine may be a component that serves as an orchestration layer that manages the distributed execution of fragments across available artificial intelligence agents. The execution engine may perform dynamic agent selection based on capability matching and may implement load balancing across available computational resources. In some cases, the execution engine may provide real-time monitoring and progress tracking capabilities and may perform adaptive rescheduling for failed or delayed tasks. The execution engine may maintain an Agent Capability Database that stores real-time information about available agents and their context window capacities, enabling dynamic fragment sizing based on current system state. The execution engine may coordinate simultaneous execution of independent sub-tasks while respecting dependency constraints established by the dependency graph.

A Result Synthesis Network may be a component that employs transformer-based attention mechanisms to intelligently combine outputs from multiple artificial intelligence agents into coherent final results. The synthesis network may implement a multi-head attention design that includes specialized attention heads for different aspects of content integration, including semantic relationships, contextual continuity, temporal relationships, and entity tracking. In some implementations, the synthesis network may include a conflict resolution mechanism that handles disagreements between agent outputs using voting mechanisms, confidence scores, and source priority rankings. The synthesis network may incorporate a coherence engine that ensures smooth transitions, proper reference linking, and style harmonization across synthesized outputs, maintaining the quality and readability of the final integrated result.

Referring to FIG. 1, an environment 100 may provide a distributed computing architecture for processing large-scale computational tasks that may exceed the capacity of individual artificial intelligence models. Environment 100 may facilitate the decomposition and routing of computational action requests across multiple autonomous artificial intelligence agents while maintaining semantic coherence and contextual integrity. In some implementations, environment 100 may enable coordination between artificial intelligence agents with varying capabilities and context window sizes to handle tasks that would otherwise be impossible for individual models to process. Environment 100 may support seamless integration of diverse artificial intelligence models, including general-purpose models and domain-specific fine-tuned models, optimizing task allocation based on each agent's capabilities and specialization.

Environment 100 may include multiple artificial intelligence agents positioned to handle different aspects of computational processing. Agent 130 may represent a first autonomous artificial intelligence agent configured to execute specific computational functions within the distributed system. Agent 150 may be a second autonomous artificial intelligence agent that may operate independently while coordinating with other agents in environment 100. Agent 170 may function as a third autonomous artificial intelligence agent that may contribute to the parallel processing capabilities of the system. Each of the agents 130, 150, 170 may possess distinct capabilities, context window sizes, and specializations that enable the system to handle diverse computational requirements across different domains and task complexities. As disclosed herein, an artificial intelligence agent or an autonomous artificial intelligence agent may be a machine learning model or another artificial intelligence component that is able to complete tasks and/or return query output (e.g., received from a prompt).

Network 140 may serve as the communication infrastructure that connects the various components within environment 100. Network 140 may facilitate bidirectional data transmission between the agents 130, 150, 170 and other system components, enabling coordinated processing of decomposed computational tasks. In some implementations, network 140 may implement cloud-based networking protocols that support distributed computing architectures and may provide the necessary bandwidth and latency characteristics for real-time coordination between artificial intelligence agents. Network 140 may maintain persistent connections with each agent while supporting dynamic routing of data fragments and computational results throughout the processing pipeline.

As further shown in FIG. 1, routing system 160 may serve as the central orchestration component that manages the decomposition, distribution, and coordination of computational tasks across the artificial intelligence agents. Routing system 160 may receive requests for executing computational functions. Each request may include function execution instructions and/or one or more indicators corresponding to request data associated with the computational function. Routing system 160 may analyze incoming requests to determine optimal decomposition strategies and may coordinate the distribution of resulting data fragments to appropriate agents based on their capabilities and current availability. In some implementations, routing system 160 may maintain real-time awareness of agent capabilities, context window limitations, and processing loads to optimize task allocation and execution scheduling.

In some implementations, routing system 160 may receive a prompt (e.g., generated by a user or a computing device). Routing system 160 may use the prompt to determine the task that is being assigned. The task may be a question to be answered, a function to be performed (e.g., purchase an airline ticket), or another suitable task or function. The request data may be extensive legal contracts, research papers, technical documentation, airline schedules, and/or other suitable request data. The request data may be received with the request. In some implementations, the request data may be retrieved using links within the request. In yet some implementations, the routing system (e.g., using a machine learning model) determine whether to obtain the request data. For example, if the routing system determines (e.g., via a machine learning model) that the user is requesting to purchase an airline ticket, the routing system may identify the sources of the data (e.g., exposed databases of different airlines) and retrieve the required data. The routing system may generate properly formatted queries for each airline database.

The routing system 160 may include specialized subsystems that handle different aspects of the task decomposition and routing process. Communication subsystem 162 may manage all data transmission and coordination activities between routing system 160 and the artificial intelligence agents throughout the network 140. Communication subsystem 162 may implement protocols for transmitting data fragments, metadata, and execution instructions to designated agents while monitoring communication status and handling transmission failures. Agent selection subsystem 164 may analyze computational requirements and agent capabilities to determine optimal assignments of data fragments and sub-functions to specific artificial intelligence agents. Agent selection subsystem 164 may consider factors such as agent specialization, context window capacity, current processing load, and historical performance when making assignment decisions.

An output subsystem 166 may handle the aggregation and synthesis of results received from the multiple artificial intelligence agents after they complete their assigned computational tasks. Output subsystem 166 may implement sophisticated mechanisms for combining outputs from different agents while resolving conflicts, maintaining coherence, and preserving the semantic relationships established during the initial task decomposition process. In some cases, the output subsystem 166 may employ attention-based mechanisms to intelligently merge distributed outputs and may generate confidence scores for different sections of the synthesized results. Output subsystem 166 may also coordinate with other subsystems to implement backpropagation of relevant findings when downstream analysis reveals opportunities for refinement or improvement of earlier processing stages.

Figure 2:
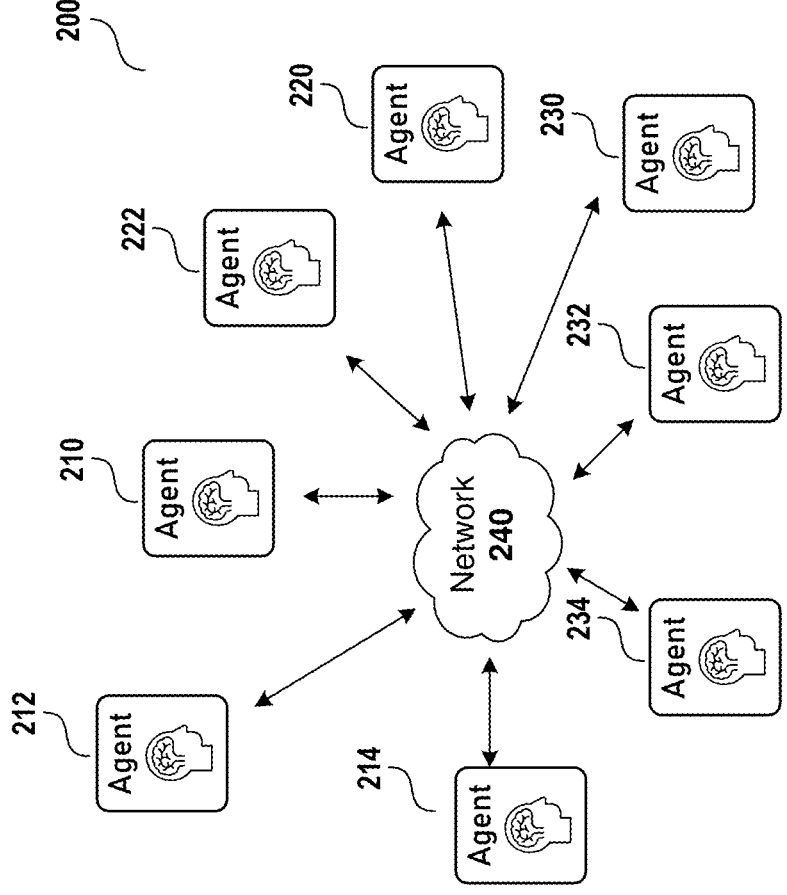
FIG. 2 illustrates an artificial intelligence agent network, in accordance with one or more embodiments of this disclosure.

Referring to FIG. 2, an agent network 200 may provide a distributed architecture that enables coordinated processing across multiple artificial intelligence agents with varying capabilities and specializations. Agent network 200 may implement a star topology configuration where multiple agents communicate through a central network infrastructure, facilitating efficient data exchange and task coordination throughout the distributed system. In some implementations, agent network 200 may support both general-purpose models with large context windows and domain-specific models with smaller but specialized processing capabilities. The architecture may enable dynamic agent selection based on task requirements, agent availability, and processing capabilities while maintaining seamless communication pathways between all connected components.

Network node 240 may serve as the central communication hub that facilitates bidirectional data transmission between all connected agents within agent network 200. Network node 240 may implement cloud-based networking protocols that support distributed computing architectures and may provide the necessary bandwidth and latency characteristics for real-time coordination between artificial intelligence agents. In some implementations, network node 240 may maintain persistent connections with each agent while supporting dynamic routing of data fragments, execution instructions, and computational results throughout the processing pipeline. Network node 240 may also coordinate with routing system 160 to receive task assignments and distribute computational workloads across the available agent pool based on current system state and agent capabilities.

Agent network 200 may include multiple general-purpose artificial intelligence models that possess large context window capabilities for handling extensive computational tasks. An agent 210 may represent a first general-purpose model that may process large-scale data fragments while maintaining semantic coherence across extended content sequences. An agent 212 may function as a second general-purpose model with distinct context window characteristics that may complement the capabilities of other agents within the network. An agent 214 may serve as a third general-purpose model that may contribute to the parallel processing capabilities of agent network 200. In some implementations, these general-purpose models may include GPT-4 with 128K context window capacity, Claude 3 with 200K context window capacity, and Gemini Pro with 32K context window capacity, enabling the system to handle diverse computational requirements across different scales of data processing.

Agent network 200 may also incorporate domain-specific artificial intelligence models that provide specialized processing capabilities within particular fields or subject areas. An agent 220 may represent a first domain-specific model that may focus on specialized computational tasks within a particular domain while operating with a smaller context window compared to general-purpose models. An agent 222 may function as a second domain-specific model that may provide expertise in a different specialized area while contributing to the overall processing capabilities of agent network 200. An agent 230 may serve as a third domain-specific model that may handle specific types of content or computational functions that benefit from specialized training and optimization. An agent 232 may represent a fourth domain-specific model that may complement the capabilities of other specialized agents within the network. An agent 234 may function as a fifth domain-specific model that may provide additional specialized processing capabilities for particular types of computational tasks. In some implementations, these domain-specific models may include Finance-BERT with 4K context window capacity, MedicalGPT with 8K context window capacity, and LegalLLM with 16K context window capacity, enabling the system to leverage specialized knowledge while managing the constraints of smaller context windows through intelligent task decomposition.

Routing system 160 may maintain an Agent Capability Database that stores real-time information about available agents and their context window capacities within agent network 200. Furthermore, the Agent Capability Database may track current processing loads, availability status, and performance characteristics for each agent connected through network node 240. In some implementations, the Agent Capability Database may enable dynamic fragment sizing based on current system state and may support intelligent agent selection for optimal task allocation. The database may also maintain historical performance data and specialization information that may inform routing decisions and execution planning throughout the distributed processing pipeline. Routing system 160 may query the Agent Capability Database when determining how to decompose computational tasks and assign resulting fragments to appropriate agents based on their current capabilities and availability within agent network 200.

Figure 4:
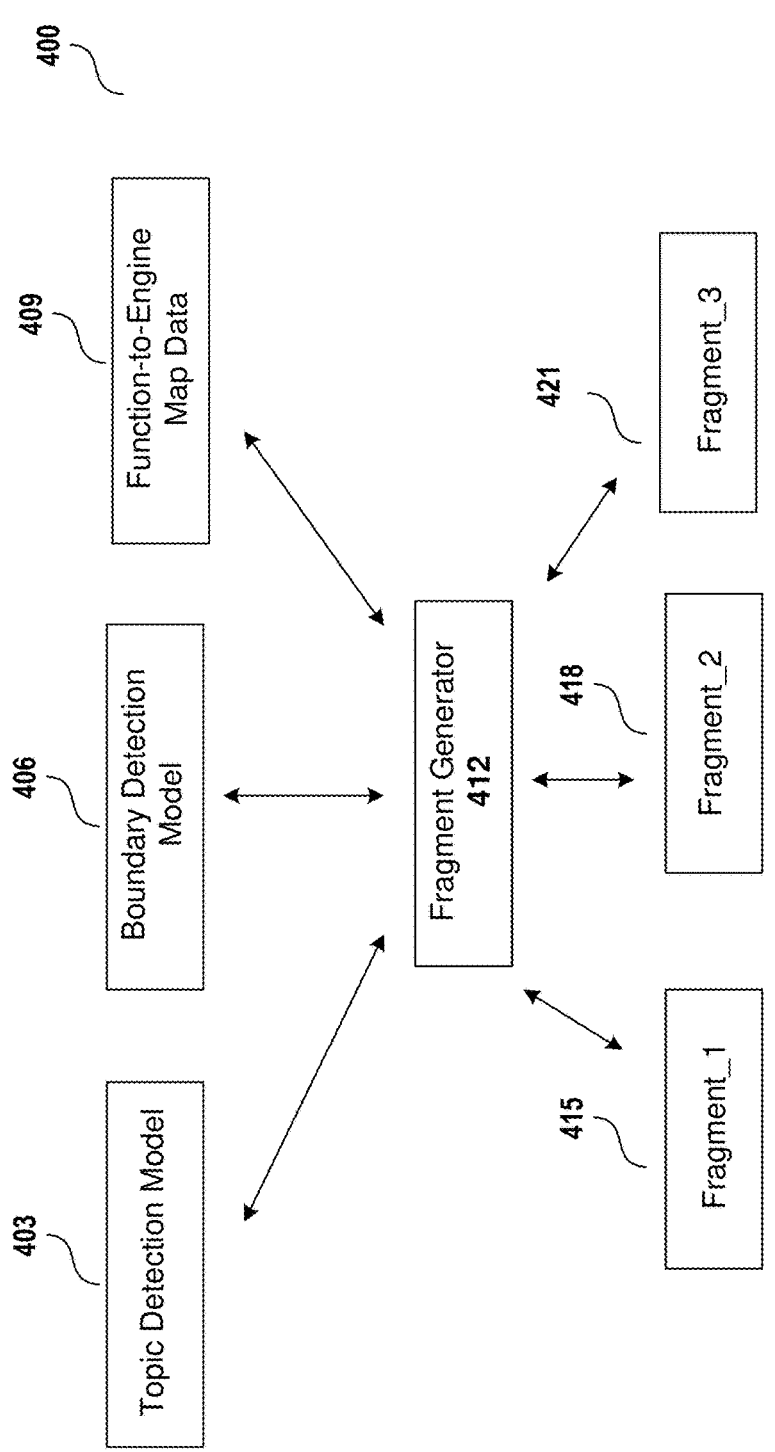
FIG. 4 illustrates a fragment generator, in accordance with one or more embodiments of this disclosure.

Referring to FIG. 4, fragment generation system 400 may provide sophisticated mechanisms for analyzing large-scale request data and creating semantically coherent data fragments that can be processed by individual artificial intelligence agents within agent network 200. Fragment generation system 400 may implement advanced natural language processing techniques to understand the semantic structure and content organization of incoming request data, enabling intelligent decomposition that preserves meaning and contextual relationships throughout the fragmentation process. In some implementations, fragment generation system 400 may be part of routing system 160 and thus may receive request data that exceeds the context window capabilities of individual agents and may analyze the content to determine optimal fragmentation strategies based on semantic boundaries, topic transitions, and logical content organization. Fragment generation system 400 may also maintain awareness of agent capabilities within agent network 200 to ensure that generated fragments align with the processing capacities and specializations of available artificial intelligence agents.

Routing system 160 may detect a plurality of sets of boundaries within the request data through an analysis mechanism that identifies natural breaking points and semantic transitions within large-scale content. Routing system 160 may analyze the request data to identify locations where content may be divided without disrupting semantic relationships or breaking logical connections between related concepts. Each set of boundaries of the plurality of sets of boundaries may be associated with the computational function or task to ensure that fragmentation aligns with the processing requirements and execution objectives of the overall task. For example, routing system 160 may analyze extensive legal contracts to identify clause boundaries, section transitions, and logical divisions that allow for meaningful fragmentation while preserving the legal context and relationships between different contract provisions.

As shown in FIG. 4, a topic detection model 403 may serve as a specialized artificial intelligence component that analyzes request data to identify and categorize different topics, themes, and subject areas within the content. Routing system 160 may input the request data into topic detection model 403 to generate a plurality of topics that represent the various subject areas, concepts, and themes present within the content. Topic detection model 403 may have been trained using a training dataset to predict corresponding topics within data input and may employ machine learning algorithms to recognize patterns, themes, and subject classifications across diverse types of content. In some implementations, topic detection model 403 may analyze narrative content to identify character development, plot progression, and thematic elements, while also being capable of processing technical documentation to recognize procedural steps, technical specifications, and domain-specific concepts. Routing system 160 may assign the plurality of topics to the plurality of sets of boundaries to ensure that fragmentation decisions align with the topical organization and thematic structure of the request data.

Topic detection model 403 may have been trained to detect the plurality of sets of boundaries based on content type of each portion of the request data, enabling adaptive boundary detection that responds to different structural and organizational patterns. In some implementations, topic detection model 403 may be trained using various criteria and parameters that enhance its ability to identify and categorize topics within diverse content types. Semantic density analysis may serve as a training parameter that measures the concentration of related concepts within specific text segments, enabling the model to identify regions where topic transitions occur naturally. The model may utilize syntactic pattern recognition to analyze sentence structures, grammatical constructions, and linguistic patterns that may indicate shifts between different subject areas or thematic content.

Contextual embedding analysis may provide training criteria that examine how words and phrases relate to surrounding content, allowing the model to understand topic boundaries based on semantic relationships rather than simple keyword matching. Topic detection model 403 may incorporate discourse marker recognition as a training parameter, identifying linguistic signals such as transitional phrases, section headers, and organizational cues that indicate topic changes or thematic shifts within the request data.

Entity relationship mapping may serve as a training criterion that analyzes how different entities, concepts, and references interact within the content, enabling the model to detect topic boundaries based on the clustering and distribution of related entities. The model may utilize temporal sequence analysis as a parameter for detecting topics that unfold over time, particularly in narrative content where character development, plot progression, and thematic evolution may indicate natural fragmentation points.

Lexical cohesion analysis may provide training criteria that examine how vocabulary choices and terminology usage patterns change throughout the content, allowing the model to identify boundaries where specialized terminology or domain-specific language transitions occur. Topic detection model 403 may incorporate rhetorical structure analysis as a training parameter, recognizing argumentative patterns, explanatory sequences, and logical progressions that may indicate distinct topical segments within technical or analytical content.

Cross-reference density may serve as a training criterion that analyzes the frequency and distribution of internal references, citations, and cross-linkages within the content, enabling the model to identify self-contained topical units that maintain high internal coherence while having fewer connections to adjacent segments. The model may utilize stylistic variation analysis as a parameter for detecting changes in writing style, tone, or presentation format that may indicate transitions between different types of content or subject matter.

Conceptual hierarchy recognition may provide training criteria that analyze how abstract concepts relate to specific examples, enabling the model to identify topic boundaries based on shifts between different levels of conceptual abstraction or detail. The topic detection model 403 may incorporate domain-specific terminology clustering as a training parameter, recognizing when specialized vocabulary from particular fields or disciplines appears in concentrated patterns that may indicate domain-specific content segments.

Semantic coherence scoring may serve as a training criterion that measures how well concepts within potential fragments relate to each other, allowing the model to optimize boundary detection for maximum internal coherence while minimizing semantic disruption across fragment boundaries. The model may utilize attention weight analysis as a parameter derived from transformer-based architectures, examining which portions of the content receive the highest attention scores when processing different segments to identify natural topic transitions.

Based on the above, the request data may include a plurality of content types including narrative, technical, or dialogue formats, each requiring different approaches to boundary detection and semantic analysis. In some implementations, topic detection model 403 may recognize that narrative content typically organizes around character interactions, scene transitions, and plot developments, while technical content may structure around procedural steps, component descriptions, and functional relationships. Topic detection model 403 may also identify dialogue content through conversational patterns, speaker transitions, and interactive exchanges that require different fragmentation strategies to maintain coherence and context across fragment boundaries.

Boundary detection model 406 may function as a specialized component that identifies optimal locations for dividing request data into processable fragments while minimizing semantic disruption and preserving contextual relationships. Boundary detection model 406 may analyze the structural organization of request data to locate natural breaking points such as paragraph boundaries, section transitions, topic shifts, and logical divisions that allow for meaningful fragmentation. In some implementations, boundary detection model 406 may coordinate with topic detection model 403 to ensure that boundary detection aligns with topical organization and thematic structure identified within the request data. Boundary detection model 406 may also consider the context window capabilities of available agents within the agent network 200 when determining boundary locations, ensuring that resulting fragments can be effectively processed by designated artificial intelligence agents.

Function engine map data 409 may provide mapping information that associates different types of computational functions with appropriate artificial intelligence agents based on their capabilities, specializations, and context window capacities. Function engine map data 409 may maintain detailed information about the processing capabilities of each agent within agent network 200, including their domain expertise, context window limitations, and performance characteristics for different types of computational tasks. In some implementations, function engine map data 409 may enable fragment generation system 400 to determine which agents are most suitable for processing specific types of content or performing particular computational functions based on the topics and content types identified during the boundary detection process. Function engine map data 409 may also track real-time availability and processing loads of agents to support dynamic assignment decisions during the fragmentation process.

As further shown in FIG. 4, a fragment generator 412 may serve as the central processing component that creates the actual data fragments based on the analysis performed by topic detection model 403, boundary detection model 406, as well as based on function engine map data 409. Routing system 160 may generate, using the plurality of sets of boundaries, a plurality of data fragments using fragment generator 412. Each data fragment of the plurality of data fragments may minimize semantic disruption for each fragment by overlapping with one or more neighboring fragments to maintain contextual continuity and preserve semantic relationships across fragment boundaries. Fragment generator 412 may implement sophisticated algorithms that calculate optimal overlap regions between adjacent fragments, often maintaining strategic overlaps of ten to twenty percent of fragment content to provide context for pronouns and references spanning fragments. For example, fragment generator 412 may analyze a technical manual to create fragments that overlap at procedural boundaries, ensuring that references to previous steps or components remain accessible to agents processing subsequent fragments.

Fragment generator 412 may track each topic of the plurality of topics across data fragments for maintaining reference coherence and ensuring that thematic consistency is preserved throughout the fragmentation process. Fragment generator 412 may implement entity tracking mechanisms that monitor the appearance and development of specific entities, concepts, and references across multiple fragments to prevent loss of contextual information during the decomposition process. In some implementations, fragment generator 412 may overlap the plurality of topics across the data fragments based on content complexity, adjusting the degree of overlap to accommodate more complex semantic relationships and ensuring that fragments with intricate interdependencies maintain sufficient contextual information. Fragment generator 412 may also perform intelligent overlap calculation that varies based on content complexity, increasing overlap percentages for content with dense semantic relationships while optimizing overlap for simpler content to balance contextual preservation with processing efficiency.

Fragment generator 412 may create multiple distinct fragments that can be processed independently while maintaining semantic coherence and contextual relationships. A first fragment 415 may represent an initial data segment that contains a semantically complete portion of the request data along with appropriate overlap regions to maintain contextual continuity with adjacent fragments. A second fragment 418 may function as a subsequent data segment that overlaps with the first fragment 415 to preserve contextual relationships while containing distinct content that can be processed by a different artificial intelligence agent within agent network 200. A third fragment 421 may serve as an additional data segment that maintains overlap with the second fragment 418 and may contain specialized content that aligns with the capabilities of domain-specific agents within agent network 200. In some implementations, each fragment may carry rich metadata including semantic boundaries, entity continuity information, cross-fragment references, dependency markers, context type classification, and priority levels that enable downstream processing components to understand the relationships and dependencies between fragments.

Figure 3:
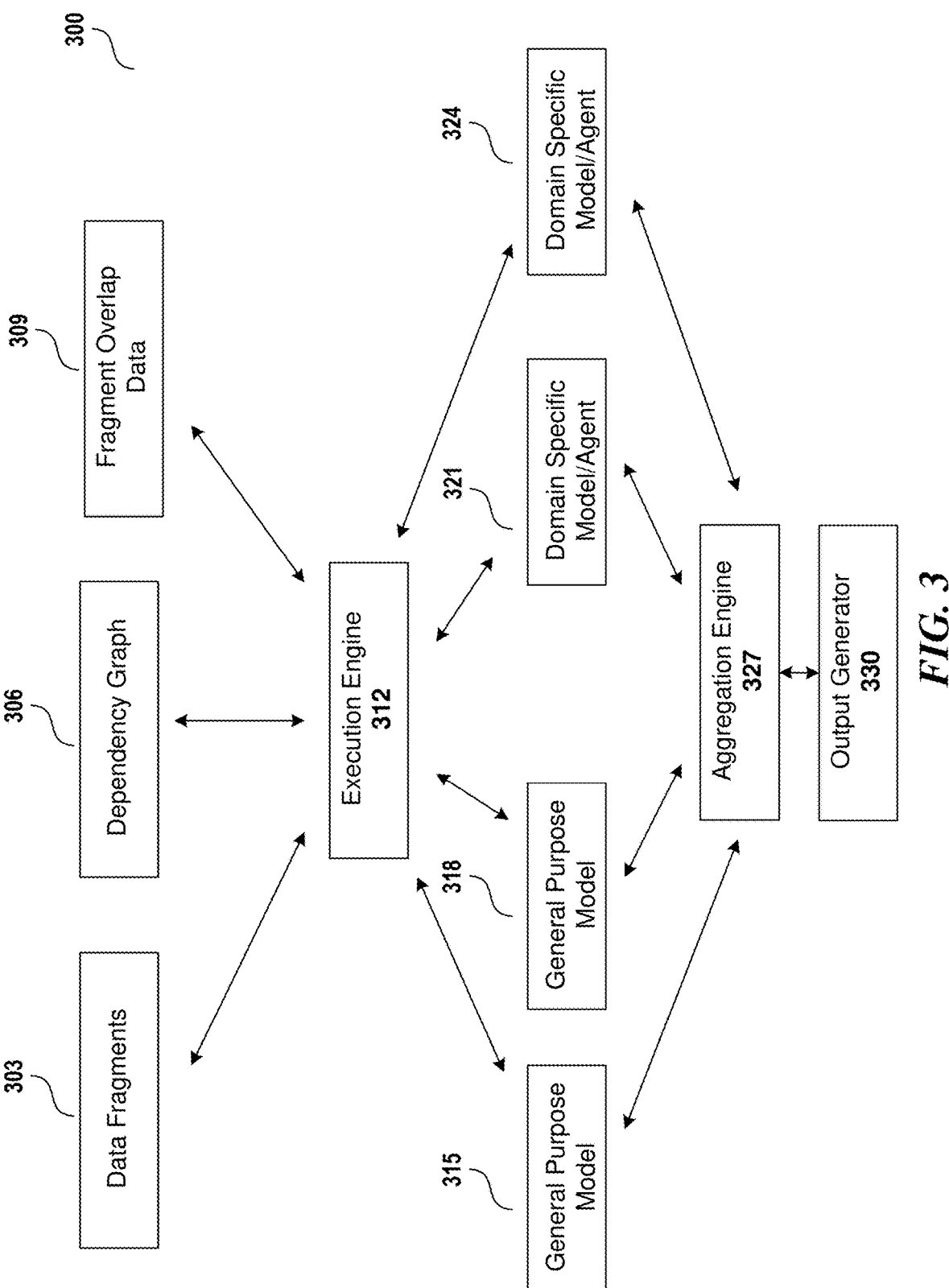
FIG. 3 illustrates logical components and data used by the routing system, in accordance with one or more embodiments of this disclosure.

Referring to FIG. 3, a system architecture 300 may provide mechanisms for mapping computational tasks and corresponding data fragments to appropriate artificial intelligence agents based on fragment characteristics and agent capabilities. Data fragments 303 may be fragments generated by the fragment generation system, with each fragment may include rich metadata comprising semantic boundaries, entity continuity information, cross-fragment references, dependency markers, context type classification, and priority levels. The metadata may enable intelligent matching between fragments and agents based on processing requirements and agent specializations. Dependency graph 306 may include dependency of various sub-functions affecting execution order of those sub-functions.

An execution engine 312 may serve as the central orchestration component that coordinates task distribution and processing across multiple artificial intelligence agents. Execution engine 312 may perform load balancing across available resources by monitoring current processing loads and agent availability. In some implementations, execution engine 312 may track real-time agent status and implement adaptive rescheduling for failed or delayed tasks to maintain efficient processing flow. Execution engine 312 may periodically determine availability metrics for each artificial intelligence agent, including current processing load, response latency, and success rate statistics.

The routing system may generate execution maps that assign sub-functions to specific artificial intelligence agents based on fragment characteristics and agent capabilities. Each execution map may include a plurality of sub-functions assigned to artificial intelligence agents based on corresponding sub-functions associated with data fragments. The routing system may analyze fragment metadata and agent capabilities to determine optimal assignments that maximize processing efficiency while maintaining semantic coherence.

A general purpose model 315 and a general purpose model 318 may provide broad processing capabilities for handling diverse computational tasks. These models may process fragments containing general content that does not require specialized domain knowledge. A domain specific model 321 and a domain specific model 324 may offer specialized processing for fragments containing domain-specific content or requiring particular expertise. The routing system may modify fragment sizes based on availability metrics to ensure fragments align with current agent processing capacities.

Execution engine 312 may perform dynamic context window optimization by continuously adapting fragment sizes based on real-time agent availability and capability metrics. When agent availability changes, execution engine 312 may recalculate optimal fragment sizes to maintain processing efficiency. For example, if an agent becomes unavailable, execution engine 312 may redistribute fragments to other agents by adjusting fragment sizes to match the available agents' context window capabilities.

Execution engine 312 may implement sophisticated load balancing algorithms that consider multiple factors when assigning fragments to agents. These factors may include current processing loads, historical performance data, and specialized capabilities of each agent. In some implementations, execution engine 312 may monitor processing progress in real-time and dynamically adjust fragment assignments to optimize overall system throughput. The execution engine 312 may also maintain backup processing paths that can be activated if primary agents experience failures or delays.

In some implementations, routing system 160 may generate, based on the plurality of sets of boundaries and corresponding data fragments, a dependency graph for the plurality of data fragments to establish logical relationships and execution sequences between computational tasks. A dependency graph may serve as a directed acyclic graph structure that maps the interdependencies between different data fragments and their associated sub-functions, enabling routing system 160 to determine optimal execution ordering while identifying opportunities for parallel processing. The dependency graph may indicate execution order of the plurality of sub-functions associated with the plurality of data fragments by analyzing data flow requirements, input-output relationships, and logical dependencies that exist between different computational tasks. For example, routing system 160 may analyze a complex research document to determine that summary generation sub-functions depend on completion of analysis sub-functions, while multiple analysis sub-functions may execute concurrently since each analysis sub-function processes independent data segments without requiring outputs from other analysis operations.

Figure 5:
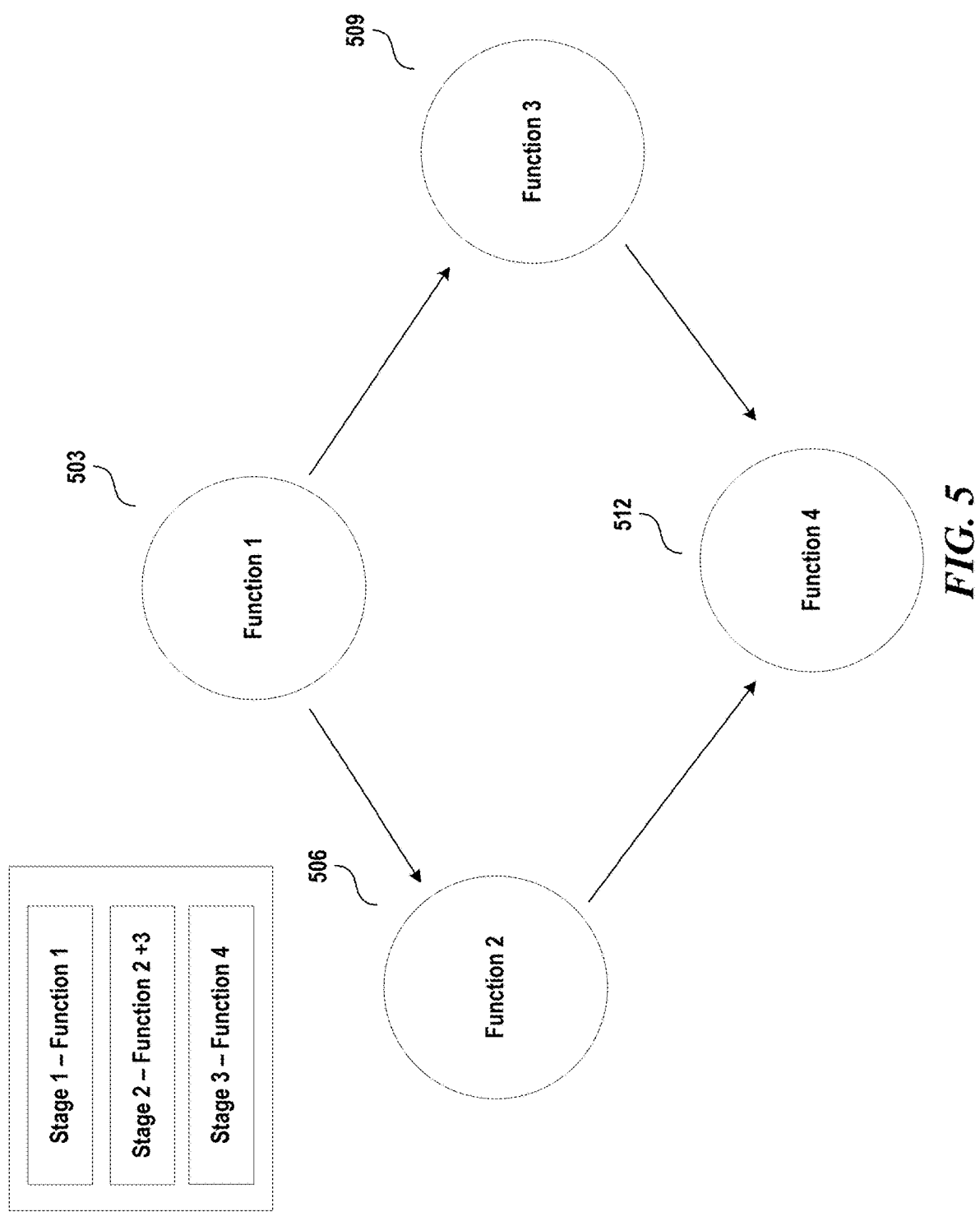
FIG. 5 illustrates a directed acyclic graph, in accordance with one or more embodiments of this disclosure.

Referring to FIG. 5, routing system 160 may implement sophisticated execution ordering mechanisms that coordinate multiple sub-functions across different processing stages while maximizing parallel execution opportunities. A first function 503 may represent an initial computational task that serves as a foundation for subsequent processing operations and may execute independently without requiring inputs from other sub-functions within the dependency graph. First function 503 may process base context information or perform preliminary analysis that generates outputs needed by downstream computational tasks, establishing the starting point for the overall execution sequence. Routing system 160 may identify first function 503 as an independent processing task that may begin execution immediately upon system initialization, since the first function 503 does not depend on outputs from other sub-functions within the computational workflow.

Routing system 160 may identify parallelizable sub-functions for concurrent execution by analyzing dependency relationships and determining which computational tasks may execute simultaneously without conflicting data requirements. A second function 506 and a third function 509 may represent parallel processing tasks that may execute concurrently after the first function 503 completes, since both second function 506 and third function 509 may depend on outputs generated by first function 503 while maintaining independence from each other. Second function 506 may process one aspect of the computational task using outputs from the first function 503, while third function 509 may simultaneously process a different aspect of the computational task using the same foundational outputs without requiring data exchange between the second function 506 and the third function 509. For example, routing system 160 may determine that document analysis tasks may execute in parallel where second function 506 performs sentiment analysis while third function 509 conducts entity extraction, both using the same preprocessed text from first function 503 but generating independent outputs that do not interfere with each other.

Routing system 160 may coordinate convergent processing operations where multiple parallel sub-functions contribute to subsequent computational tasks that require integrated inputs from multiple sources. A fourth function 512 may represent a synthesis operation that depends on completion of both second function 506 and third function 509, requiring the routing system 160 to coordinate timing and data flow to ensure that all prerequisite outputs are available before fourth function 512 begins execution. Fourth function 512 may combine results from the parallel processing operations performed by second function 506 and third function 509 to generate comprehensive outputs that integrate multiple analytical perspectives or computational results. Routing system 160 may monitor completion status of second function 506 and third function 509 to determine when fourth function 512 may begin processing, ensuring that all required inputs are available and properly formatted for the synthesis operation.

Routing system 160 may input the plurality of sub-functions and the corresponding data fragments into a graph generation machine learning model to generate a plurality of execution paths for the plurality of sub-functions through automated analysis of computational dependencies and processing requirements. The graph generation machine learning model may have been trained using a training data set to identify parallelizable sub-functions for concurrent execution by analyzing patterns in computational workflows, data dependencies, and processing sequences across diverse types of computational tasks. The graph generation machine learning model may analyze the relationships between first function 503, second function 506, third function 509, and fourth function 512 to generate multiple possible execution paths that respect dependency constraints while optimizing for parallel processing opportunities. For example, the graph generation machine learning model may identify that first function 503 may execute independently, followed by concurrent execution of second function 506 and third function 509, with fourth function 512 executing after both parallel functions complete, while also generating alternative execution paths that account for different agent availability scenarios or processing priorities.

Routing system 160 may implement cycle detection and prevention mechanisms using topological sort with depth-first search algorithms to ensure the dependency graph remains acyclic throughout the processing workflow. The topological sort algorithm may analyze the dependency relationships between first function 503, second function 506, third function 509, and fourth function 512 to verify that no circular dependencies exist that would create infinite processing loops or deadlock conditions. The depth-first search component may traverse the dependency graph systematically to identify any potential cycles by examining each node and its connections to determine whether any path leads back to a previously visited node. For example, routing system 160 may verify that fourth function 512 does not create dependencies that loop back to first function 503, second function 506, or third function 509, ensuring that the execution flow maintains a clear directional progression from initial processing through parallel operations to final synthesis.

Routing system 160 may input the plurality of execution paths and the plurality of availability metrics into a path optimization machine learning model to generate an optimized path for executing the plurality of sub-functions based on current system conditions and agent capabilities. The path optimization machine learning model may have been trained using a training dataset to output an execution path optimized for execution time based on agent availability and sub-function execution reordering, enabling dynamic adaptation of the dependency graph to accommodate changing system conditions. The path optimization machine learning model may analyze the availability metrics for agents within agent network 200 to determine which agents may process first function 503, second function 506, third function 509, and fourth function 512 most efficiently based on current processing loads, context window capabilities, and specialization characteristics. For example, the path optimization machine learning model may determine that general purpose model 315 may handle first function 503 while domain specific model 321 and domain specific model 324 process second function 506 and third function 509 concurrently, with general purpose model 318 performing fourth function 512 after the parallel operations complete.

Routing system 160 may implement failure recovery mechanisms that maintain processing continuity when individual agents within agent network 200 experience operational difficulties or become unavailable during execution. Routing system 160 may determine that the optimized path has one or more artificial intelligence agents that have failed by monitoring processing status, response times, and communication connectivity with agents assigned to execute first function 503, second function 506, third function 509, or fourth function 512. Routing system 160 may input the plurality of execution paths, the plurality of availability metrics, and one or more indications of the one or more artificial intelligence agents that have failed into the path optimization machine learning model to generate alternative execution strategies. The path optimization machine learning model may have been trained to output, based on agent availability, a given execution path optimized for a given execution time while accommodating agent failures and maintaining processing continuity. Routing system 160 may receive from the path optimization machine learning model an updated optimized path for executing the plurality of sub-functions avoiding the one or more artificial intelligence agents that have failed, ensuring that computational tasks may continue processing through alternative agent assignments and modified execution sequences that preserve the logical dependencies established in the dependency graph.

Routing system 160 may transmit data fragments and corresponding metadata to artificial intelligence agents within agent network 200 based on the dependency relationships established in the dependency graph and the agent assignments determined through the execution map. The transmission process may coordinate the distribution of computational tasks across multiple agents while ensuring that each agent receives the appropriate data fragments, contextual information, and processing instructions needed to execute their assigned sub-functions autonomously. Routing system 160 may analyze the dependency graph to determine the optimal timing for transmitting fragments to different agents, ensuring that agents processing dependent tasks receive their assignments only after prerequisite operations have been completed or initiated. Routing system 160 may also coordinate with network 140 to manage the communication pathways and data transfer protocols needed to deliver fragments and metadata to designated agents efficiently and reliably.

The data fragments transmitted by routing system 160 may include rich metadata with semantic boundaries, entity continuity information, cross-fragment references, dependency markers, context type classification, and priority levels that enable agents to understand the context and relationships associated with their assigned processing tasks. Semantic boundaries within the metadata may provide information about the topical organization and thematic structure of each fragment, enabling agents to understand how their assigned content relates to the overall computational task and adjacent fragments. Entity continuity information may track the appearance and development of specific entities, concepts, and references across multiple fragments, ensuring that agents maintain awareness of contextual relationships that span beyond their individual processing assignments. Cross-fragment references may identify connections and dependencies between different fragments, enabling agents to understand how their outputs may influence or be influenced by processing operations performed by other agents within the distributed system.

The routing system may implement disjointed boundaries to handle complex content structures where logical divisions do not follow sequential patterns within the request data. In some implementations, disjointed boundaries may allow the system to identify and group related content segments that are physically separated within the original document but share semantic relationships or thematic connections. For example, when processing a technical manual that contains procedural steps interspersed with safety warnings throughout different sections, the routing system may detect disjointed boundaries that group all safety-related content into cohesive fragments regardless of their original positions in the document. This approach may enable the system to create more semantically meaningful data fragments that preserve conceptual relationships while optimizing the assignment of specialized artificial intelligence agents based on content type rather than document structure.

The implementation of disjointed boundaries may provide enhanced flexibility in fragment generation by allowing the routing system to reorganize content based on functional relationships rather than linear document flow. In some cases, the boundary detection model may identify that certain topics or entities appear in multiple non-contiguous sections of the request data, and the system may create fragments that consolidate these related elements to improve processing efficiency and analytical coherence. For instance, when analyzing a legal contract that references specific clauses and definitions scattered throughout the document, the routing system may use disjointed boundaries to create fragments that combine all references to particular legal concepts, enabling domain-specific artificial intelligence agents to process complete contextual information about each concept rather than fragmented references. This approach may improve the accuracy of specialized processing while maintaining the dependency relationships established in the execution map and dependency graph.

Dependency markers within the metadata may specify the relationships between different sub-functions (e.g., subtasks) and the sequencing requirements that govern the execution order of computational tasks across multiple agents. Context type classification may categorize fragments based on their content characteristics, such as narrative, technical, or dialogue formats, enabling agents to apply appropriate processing strategies and analytical approaches based on the specific nature of their assigned content. Priority levels may indicate the relative importance and urgency of different fragments, enabling agents to allocate computational resources and processing attention based on the strategic value of their assigned tasks within the overall computational workflow. Fragment overlap data 309 may provide information about the contextual bridges and shared content regions between adjacent fragments, enabling agents to understand the continuity relationships and semantic connections that link their processing tasks to related operations performed by other agents.

Each artificial intelligence agent within agent network 200 may be associated with a corresponding computer-executable operation set that defines the specific computational capabilities, processing algorithms, and analytical functions that the agent may perform autonomously on assigned data fragments. The computer-executable operation sets may vary significantly between different types of agents, with general purpose model 315 and general purpose model 318 possessing broad computational capabilities that enable them to handle diverse types of content and processing tasks across multiple domains. Domain specific model 321 and domain specific model 324 may possess specialized computer-executable operation sets that focus on particular fields or subject areas, providing enhanced processing capabilities for content that requires domain expertise or specialized analytical approaches. The computer-executable operation sets may include natural language processing algorithms, semantic analysis functions, entity recognition capabilities, and content generation mechanisms that enable agents to process their assigned fragments and generate meaningful outputs that contribute to the overall computational objectives. In some implementations, agents may be enabled to perform sub-functions that call for some type of action (e.g., reserve a hotel, purchase airline ticket, etc.)

The autonomous execution capabilities of each agent may enable independent processing of assigned fragments without requiring continuous supervision or intervention from routing system 160 during the execution phase. Each agent may analyze the metadata associated with their assigned fragments to understand the processing requirements, contextual relationships, and output specifications needed to complete their computational tasks effectively. The agents may apply their computer-executable operation sets to process the fragment content, generate analytical results, and produce outputs that align with the dependency requirements and execution specifications established in the dependency graph and execution map. The autonomous nature of agent execution may enable parallel processing of independent tasks while maintaining coordination through the metadata and dependency information provided during the initial fragment transmission phase.

The software application set associated with each agent may provide the computational infrastructure and processing environment needed to execute the computer-executable operation sets on assigned data fragments. The software application set may include machine learning frameworks, natural language processing libraries, data analysis tools, and computational resources that enable agents to perform their specialized functions efficiently and effectively. Different agents within agent network 200 may operate on different software application sets that are optimized for their specific capabilities and processing requirements, with general-purpose agents utilizing broad computational platforms while domain-specific agents may employ specialized software environments tailored to their particular areas of expertise. The software application sets may also provide the communication interfaces and data handling mechanisms needed for agents to receive fragment assignments from routing system 160 and transmit completed results to output subsystem 166 for aggregation and synthesis operations. In some implementations, the software application set may also include data for agents to operate on.

The routing system may aggregate and transmit a plurality of outputs received from the plurality of artificial intelligence agents through sophisticated mechanisms that combine distributed processing results into coherent final outputs. The aggregation process may coordinate the collection of computational results from multiple agents within the agent network, including outputs from general purpose model 315, general purpose model 318, domain specific model 321, and domain specific model 324 after each agent completes processing of assigned data fragments and sub-functions. The routing system may implement timing coordination mechanisms that ensure all required outputs are collected before beginning the synthesis process, while also managing scenarios where some agents may complete processing earlier than others. For example, the routing system may collect sentiment analysis results from domain specific model 321 and entity extraction outputs from the domain specific model 324 while waiting for comprehensive document analysis results from general purpose model 315, coordinating the timing to ensure that all outputs are available for integrated processing.

An aggregation engine 327 may serve as the central component responsible for combining outputs from multiple artificial intelligence agents into unified results that preserve the semantic relationships and contextual integrity established during the initial task decomposition process. Aggregation engine 327 may receive completion data from agents that have processed different fragments and sub-functions, analyzing the relationships between outputs to determine how distributed results may be integrated effectively. The aggregation engine 327 may implement sophisticated data structure analysis that examines the format, content type, and semantic characteristics of each output to determine appropriate combination strategies. For example, aggregation engine 327 may receive structured data outputs from financial analysis agents alongside narrative summaries from general-purpose agents, requiring different integration approaches to combine quantitative results with qualitative insights while maintaining coherence across different output formats.

The routing system may include a Result Synthesis Network that employs transformer-based attention mechanisms with multi-head attention design including semantic head, context head, temporal head, and entity head to intelligently merge distributed outputs while preserving contextual relationships. The semantic head may focus on analyzing meaning relationships between different agent outputs, identifying conceptual connections and thematic alignments that enable coherent integration of results from multiple processing sources. The context head may maintain contextual continuity by analyzing how outputs from different fragments relate to the overall computational task and ensuring that contextual bridges established during fragmentation are preserved in the final synthesized results. The temporal head may preserve time-based relationships and sequential dependencies between outputs, particularly when processing content that includes chronological elements or procedural sequences that span multiple fragments. The entity head may track entity references across fragments and agent outputs, ensuring that references to specific entities, concepts, or objects remain consistent and properly linked throughout the synthesized results.

Aggregation engine 327 may include a conflict resolution mechanism that handles disagreements between agent outputs using voting mechanisms, confidence scores, and source priority to resolve inconsistencies and contradictions that may arise when multiple agents process related content or overlapping information. The voting mechanisms may analyze outputs from multiple agents to identify consensus positions and majority interpretations when agents produce different analytical results for similar content or overlapping data segments. The confidence scores may provide quantitative measures of reliability and certainty for different agent outputs, enabling aggregation engine 327 to weight contributions based on the confidence levels reported by individual agents during their processing operations. The source priority system may establish hierarchical preferences for different types of agents based on their specialization and expertise, giving higher priority to domain-specific agents when processing content within their areas of specialization while maintaining balanced consideration of general-purpose agent contributions. For example, the conflict resolution mechanism may prioritize outputs from domain specific model 321 when processing financial content while giving equal weight to outputs from general purpose model 315 and general purpose model 318 when synthesizing general analytical results.

Aggregation engine 327 may include a coherence engine that ensures smooth transitions, proper reference linking, and style harmonization across synthesized outputs to maintain readability and logical flow throughout the integrated results. The coherence engine may analyze transition points between outputs from different agents to identify locations where additional connecting language or explanatory content may be needed to maintain smooth narrative flow and logical progression. The proper reference linking functionality may ensure that references to entities, concepts, or previous content sections remain accurate and accessible throughout the synthesized output, even when the original references span multiple fragments processed by different agents. The style harmonization component may analyze writing style, tone, and presentation format across different agent outputs to create consistent stylistic characteristics throughout the final synthesized results. For example, the coherence engine may adjust formal technical language from specialized agents to match the overall tone established by general-purpose agents, while ensuring that technical accuracy and specialized insights are preserved during the harmonization process.

An output generator 330 may serve as the final component in the synthesis pipeline, producing the completed integrated results that combine all agent outputs into coherent final deliverables. Output generator 330 may receive processed and synthesized content from aggregation engine 327 and may apply final formatting, quality validation, and presentation optimization to ensure that the final outputs meet the specifications and requirements established in the original computational request. Output generator 330 may implement quality assurance mechanisms that verify completeness, accuracy, and coherence of the synthesized results before transmission to requesting systems or users. For example, output generator 330 may perform final validation checks to ensure that all required analytical components are present, that references and citations are properly formatted, and that the overall output structure aligns with the computational objectives specified in the original request.

The routing system may receive, from a first artificial intelligence agent of the plurality of artificial intelligence agents, first sub-function completion data associated with a first sub-function of the plurality of sub-functions. The first sub-function may be associated with a first topic of a plurality of topics identified during the fragmentation process. The first sub-function completion data may include analytical results, processed content, extracted information, or other computational outputs generated by the first artificial intelligence agent during processing of assigned data fragments. The routing system may analyze the first sub-function completion data to understand the scope, quality, and characteristics of the results produced by the first artificial intelligence agent, while also identifying any dependencies or relationships that may influence subsequent processing operations. For example, the routing system may receive document analysis results from general purpose model 315 that include topic summaries, key entity identifications, and thematic analysis related to financial content, with the first topic representing financial risk assessment themes identified during the initial fragmentation process.

The routing system may receive, from a second artificial intelligence agent of the plurality of artificial intelligence agents, second sub-function completion data associated with a second sub-function of the plurality of sub-functions. The second sub-function may be associated with the first topic of the plurality of topics to enable comparative analysis and integrated processing of related content. The second sub-function completion data may provide additional analytical perspectives, complementary insights, or specialized processing results that relate to the same topical area addressed by the first sub-function, enabling the routing system to combine multiple analytical approaches for comprehensive understanding of the first topic. The routing system may coordinate the timing of receiving the first sub-function completion data and the second sub-function completion data to enable effective comparison and integration of results from both artificial intelligence agents. For example, the routing system may receive specialized financial analysis results from domain specific model 321 that include detailed risk calculations, regulatory compliance assessments, and industry-specific insights related to the same financial risk assessment themes processed by general purpose model 315, enabling comprehensive analysis that combines general analytical capabilities with specialized domain expertise.

The routing system may determine that the second sub-function completion data includes newly discovered data related to the first topic by analyzing the content, insights, and analytical results produced by the second artificial intelligence agent to identify information that was not present or recognized in the first sub-function completion data. The newly discovered data may include additional entities, relationships, insights, or analytical conclusions that provide enhanced understanding of the first topic beyond what was identified during the initial processing by the first artificial intelligence agent. The routing system may implement comparison algorithms that analyze the semantic content, factual information, and analytical conclusions present in both the first sub-function completion data and the second sub-function completion data to identify novel information and enhanced insights. For example, the routing system may determine that the specialized financial analysis performed by domain specific model 321 identified additional regulatory requirements, industry-specific risk factors, or compliance considerations that were not recognized during the general document analysis performed by general purpose model 315, representing newly discovered data that enhances the overall understanding of financial risk assessment themes.

The routing system may perform backpropagation of the newly discovered data to influence interpretation of the first sub-function completion data. The backpropagation may enable iterative refinement of the first sub-function completion data through reanalysis and enhancement based on insights gained from subsequent processing operations. The backpropagation process may involve transmitting the newly discovered data back to first artificial intelligence agent or to aggregation engine 327 for reprocessing of the first sub-function completion data in light of the additional information and insights. The iterative refinement capability may enable the routing system to improve the accuracy, completeness, and analytical depth of earlier processing results by incorporating knowledge and insights that become available during later stages of the distributed processing workflow. For example, the routing system may transmit the specialized regulatory compliance insights discovered by domain specific model 321 back to general purpose model 315 for reanalysis of the original document content, enabling general purpose model 315 to identify additional compliance-related themes and risk factors that were not apparent during the initial analysis phase, thereby enhancing the overall quality and comprehensiveness of the financial risk assessment results.

The routing system may implement cascading context propagation mechanisms that enable information discovered during later processing stages to influence and enhance the interpretation of earlier computational results. This advanced feature allows the system to propagate newly discovered insights, relationships, or analytical findings backward through the processing pipeline to refine previous analyses and improve overall computational accuracy. The cascading context propagation may operate through sophisticated feedback loops that monitor downstream processing results and identify information that may enhance the understanding or interpretation of previously processed fragments. For example, the routing system may implement cascading context propagation by analyzing specialized domain analysis results to identify regulatory compliance factors that were not apparent during initial general document processing, then propagating these compliance insights back to earlier processing stages to enable enhanced interpretation of contract clauses or legal provisions that were initially processed without the benefit of specialized domain knowledge.

The routing system may implement automatic backpropagation mechanisms that provide feedback pathways for reprocessing fragments when downstream analysis reveals issues, inconsistencies, or opportunities for improvement in earlier computational results. This automatic backpropagation capability enables the system to maintain dynamic quality control throughout the distributed processing workflow by continuously monitoring processing results and identifying situations where earlier analyses may benefit from refinement or enhancement based on subsequently discovered information. The automatic backpropagation may operate through intelligent monitoring algorithms that analyze the coherence, consistency, and completeness of processing results across multiple agents and processing stages. For example, the routing system may implement automatic backpropagation by detecting inconsistencies between financial risk assessments performed by different specialized agents, then automatically triggering reprocessing of earlier document fragments with enhanced context and analytical parameters to resolve the inconsistencies and improve the overall accuracy of the financial analysis results.

Furthermore, the cascading context propagation may enable iterative refinement processes that progressively improve the quality and accuracy of computational results through multiple processing cycles that incorporate newly discovered information and enhanced analytical insights. The iterative refinement capability may allow the routing system to perform multiple passes through the processing pipeline, with each iteration benefiting from the knowledge and insights gained during previous processing cycles. The routing system may coordinate iterative refinement by maintaining version control mechanisms that track changes and improvements across multiple processing iterations while preserving the ability to compare results and validate enhancements. For example, the routing system may enable iterative refinement by performing initial document analysis to identify basic themes and entities, then using specialized domain analysis results to enhance the understanding of technical terminology and industry-specific concepts, followed by additional refinement cycles that incorporate cross-reference analysis and contextual relationship mapping to produce progressively more comprehensive and accurate analytical results.

In some implementations, the automatic backpropagation mechanisms may handle dynamic optimization based on real-time conditions by continuously monitoring system performance, agent availability, and processing quality to identify opportunities for improving computational efficiency and result accuracy. The dynamic optimization capability may enable the routing system to adapt processing strategies, fragment assignments, and analytical approaches based on changing system conditions, agent performance characteristics, and emerging patterns in computational results. The routing system may implement dynamic optimization through machine learning algorithms that analyze processing patterns, success rates, and quality metrics to identify optimal configurations and processing strategies for different types of computational tasks. For example, the routing system may handle dynamic optimization by monitoring the performance of different agent combinations for financial document analysis, identifying that certain combinations of general-purpose and domain-specific agents produce higher quality results for particular types of financial content, then automatically adjusting future fragment assignments and processing strategies to leverage these optimal agent combinations while adapting to changing agent availability and processing loads.

The cascading context propagation and automatic backpropagation mechanisms may work together to create comprehensive feedback systems that enable continuous improvement of computational results throughout the distributed processing workflow. The integration of these advanced features may allow the routing system to maintain high levels of analytical accuracy and coherence while adapting to complex computational requirements and dynamic system conditions. The routing system may coordinate cascading context propagation and automatic backpropagation through sophisticated control mechanisms that manage the timing, scope, and intensity of feedback operations to optimize processing efficiency while maximizing result quality. For example, the routing system may coordinate these advanced features by implementing threshold-based triggering mechanisms that initiate cascading context propagation when downstream analysis reveals information that exceeds predetermined relevance thresholds for earlier processing stages, while simultaneously implementing automatic backpropagation when quality metrics indicate that reprocessing may improve result accuracy beyond specified improvement thresholds, thereby creating a balanced approach that maximizes computational quality while managing processing overhead and system resource utilization.

Computing Environment

Figure 6:
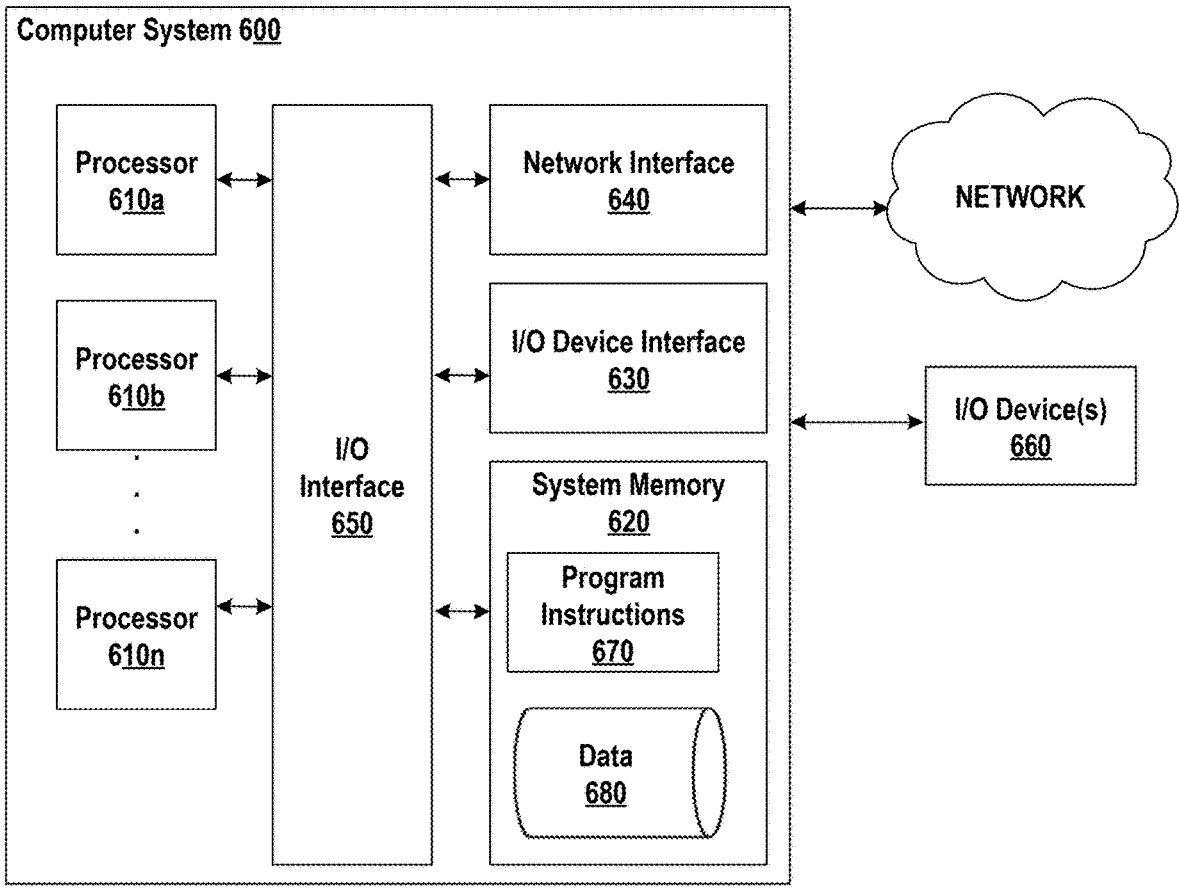
FIG. 6 illustrates an exemplary computing system, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a, 610b, 610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetic, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
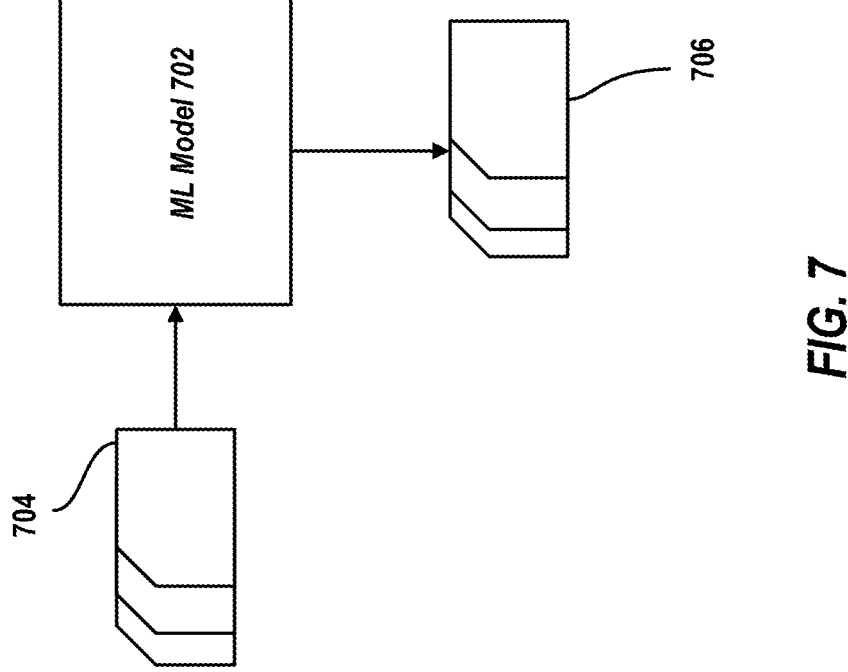
FIG. 7 illustrates an exemplary machine learning model, in accordance with one or more embodiments of this disclosure.

FIG. 7 illustrates an exemplary machine learning model 702. Any artificial intelligence agents and/or models described herein may be implemented as a machine learning model (e.g., machine learning model 702). According to some examples, the machine learning model may be any model, such as a model for data imputation. For example, the machine learning model may be trained to intake input 704. As a result of inputting the input 704 into the machine learning model, the model may then output an output 706, which may include, for example, an imputed value. Furthermore, as described, the machine learning model may be configured to output a confidence interval or other metric for certainty regarding the outputs. Output 706 may include output parameters.

The output parameters may be fed back to the machine learning model as input to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction and reference feedback information (e.g., user indication of accuracy, reference labels, or other information). Connection weights may be adjusted, for example, if the machine learning model is a neural network, to reconcile differences between the neural network's prediction and the reference feedback.

One or more neurons of the neural network may require that their respective errors are sent backward through the neural network to facilitate the update process (e.g., back-propagation of error). Updates to the connection weights may, for example, be reflective of the magnitude of error propagated backward after a forward pass has been completed.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connections may be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model may be self-learning and/or trained rather than explicitly programmed and may perform significantly better in certain areas of problem-solving as compared to computer programs that do not use machine learning. During training, an output layer of the machine learning model may correspond to a classification or imputation of the machine learning model, and an input known to correspond to that classification or imputation value may be input into an input layer of the machine learning model during training. During testing, an input without a known classification or known imputation value may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector. The machine learning model may be structured as a factorization machine model. The machine learning model may be a non-linear model and/or supervised learning model that can perform classification and/or regression. For example, the machine learning model may be a general-purpose supervised learning algorithm that the system uses for both classification and regression tasks. Alternatively, the machine learning model may include a Bayesian model configured to perform variational inference on the graph and/or vector.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer"), and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from publicly available sources. Such a technique may be used to identify values and generate a corpus that can be accessed to impute values. For example, in some embodiments, if a value is missing, the model may access the corpus to identify relevant information for the missing value. For example, the values can be used to calculate the missing value. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. The specific training samples may be used to generate language in a certain style or in a certain format.

Some concepts in ML-based language models will now be discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or, in the case of an LLM, may contain millions or billions of learned parameters or more. As non-limiting examples, a language model may generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models may also be used for chatbots (e.g., virtual assistance).

A type of neural network architecture, referred to as a "transformer," may be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 8:
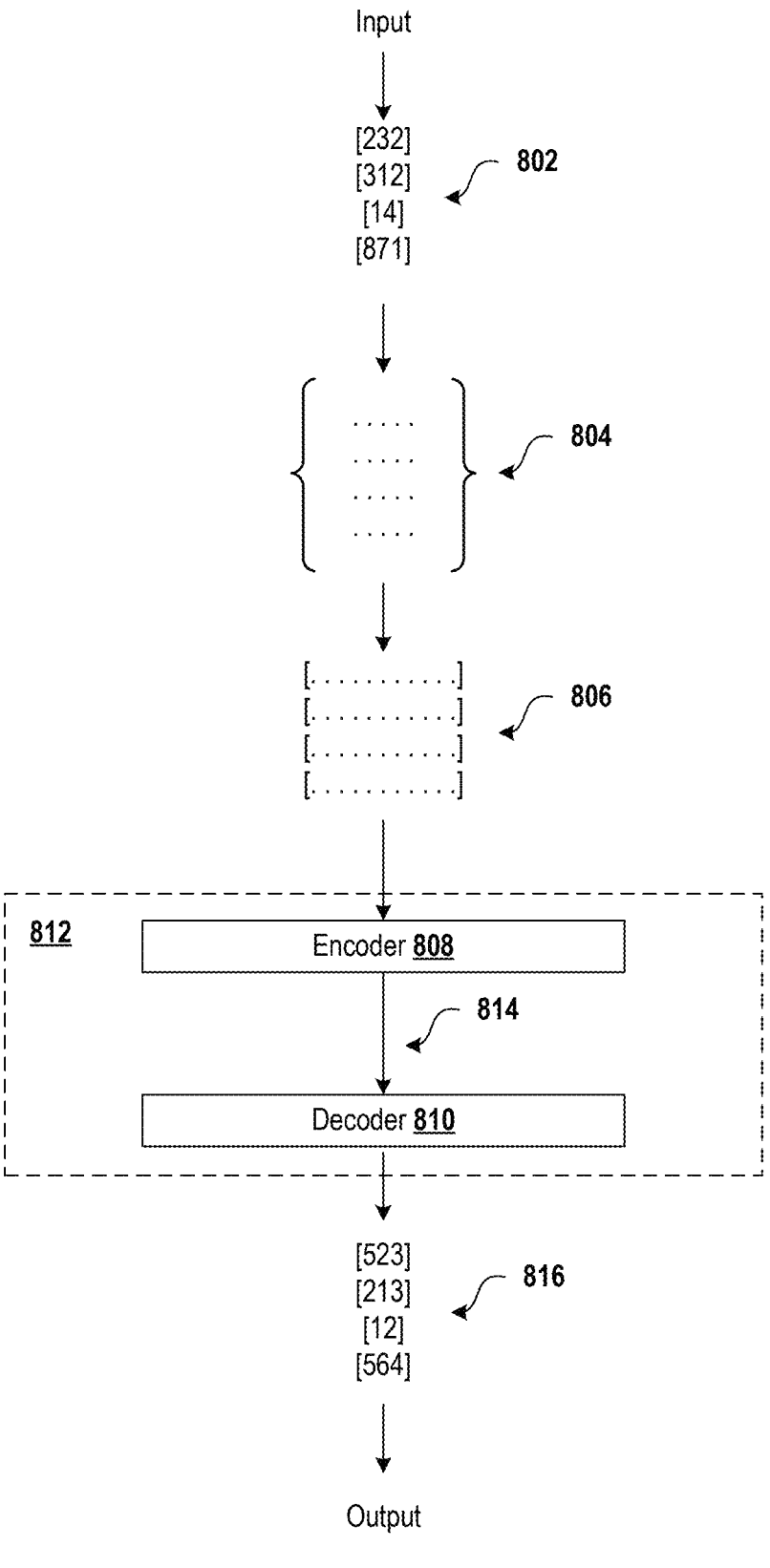
FIG. 8 is a block diagram of an example transformer that may be used with one or more machine learning models, in accordance with one or more embodiments of this disclosure.

FIG. 8 is a block diagram of an example transformer 812. Any language models or agents described herein may implement a transformer 812 as shown below. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

Transformer 812 may include an encoder 808 (which may include one or more encoder layers/blocks connected in series) and a decoder 810 (which may include one or more decoder layers/blocks connected in series). Generally, encoder 808 and decoder 810 may each include multiple neural network layers, at least one of which may be a self-attention layer. The parameters of the neural network layers may be referred to as the parameters of the language model.

Transformer 812 may be trained to perform certain functions on a natural language input. Examples of the functions include summarizing existing content, brainstorming ideas, writing a rough draft, fixing spelling and grammar, and translating content. Summarizing may include extracting key points or themes from an existing content in a high-level summary. As described herein, it may take existing content from publicly available sources (e.g., text, images, etc.) to help in imputing missing values. Brainstorming ideas may include generating a list of ideas based on provided input. For example, the ML model may generate a list of names for a startup or costumes for an upcoming party. Writing a rough draft may include generating writing in a particular style that may be useful as a starting point for the user's writing. The style may be identified as, e.g., an email, a blog post, a social media post, or a poem. Fixing spelling and grammar may include correcting errors in an existing input text. Translating may include converting an existing input text into a variety of different languages. In some implementations, transformer 812 is trained to perform certain functions on other input formats than natural language input. For example, the input may include objects, images, audio content, or video content, or a combination thereof. In some examples, this may be used to generate commands for authorizing and completing the transaction, for example.

Transformer 812 may be trained on a text corpus that is labeled (e.g., annotated to indicate verbs, nouns) or unlabeled. LLMs may be trained on a large unlabeled corpus. The term "language model," as used herein, may include an ML-based language model (e.g., a language model that is implemented using a neural network or other ML architecture), unless stated otherwise. Some LLMs may be trained on a large multi-language, multi-domain corpus to enable the model to be versatile at a variety of language-based tasks such as generative tasks (e.g., generating human-like natural language responses to natural language input).

FIG. 8 illustrates an example of how transformer 812 may process textual input data. Input to a language model (whether transformer-based or otherwise) typically is in the form of natural language that may be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without white space appended. In some implementations, a token may correspond to a portion of a word.

For example, the word "greater" may be represented by a token for [great] and a second token for [er]. In another example, the text sequence "write a summary" may be parsed into the segments [write], [a], and [summary], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a list, a paragraph), an [EOT] token may be another special token that indicates the end of the textual sequence, other tokens can provide formatting information, etc.

In FIG. 8, a short sequence of tokens 802 corresponding to the input text is illustrated as input to transformer 812. Tokenization of the text sequence into tokens 802 may be performed by some pre-processing tokenization module such as, for example, a byte-pair encoding tokenizer (the "pre" referring to the tokenization occurring prior to the processing of the tokenized input by the LLM), which is not shown in FIG. 8 for brevity. In general, the token sequence that is inputted into transformer 812 may be of any length up to a maximum length defined based on the dimensions of transformer 812. Each token 802 in the token sequence is converted into an embedding 806 (also referred to as "embedding vector").

Embedding 806 is a learned numerical representation (such as, for example, a vector) of a token that captures some semantic meaning of the text segment represented by the token 802. Embedding 806 represents the text segment corresponding to token 802 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, embedding 806 corresponding to the "write" token will be closer to another embedding corresponding to the "jot down" token in the vector space as compared to the distance between the embedding 806 corresponding to the "write" token and another embedding corresponding to the "summary" token.

The vector space may be defined by the dimensions and values of the embedding vectors. Various techniques may be used to convert token 802 into embedding 806. For example, another trained ML model may be used to convert token 802 into embedding 806. In particular, another trained ML model may be used to convert token 802 into embedding 806 in a way that encodes additional information into embedding 806 (e.g., a trained ML model may encode positional information about the position of token 802 in the text sequence into the embedding 806). In some implementations, the numerical value of token 802 may be used to look up the corresponding embedding in an embedding matrix 804, which may be learned during training of transformer 812.

The generated embeddings, e.g., such as embedding 806, are input into the encoder 808. Encoder 808 serves to encode embedding 806 into feature vectors 814 that represent the latent features of embedding 806. Encoder 808 can encode positional information (i.e., information about the sequence of the input) in feature vectors 814. Feature vectors 814 may have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as feature vectors 814 that may be generated by encoder 808 may be referred to as a latent space or feature space.

Conceptually, decoder 810 is designed to map the features represented by feature vectors 814 into meaningful output, which may depend on the task that was assigned to transformer 812. For example, if transformer 812 is used for a translation task, decoder 810 may map feature vectors 814 into text output in a target language different from the language of the original tokens 802. Generally, in a generative language model, decoder 810 serves to decode feature vectors 814 into a sequence of tokens. Decoder 810 may generate output tokens 816 one by one. Each output token 816 may be fed back as input to decoder 810 in order to generate the next output token 816. By feeding back the generated output and applying self-attention, decoder 810 may generate a sequence of output tokens 816 that has sequential meaning (e.g., the resulting output text sequence is understandable as a sentence and obeys grammatical rules). Decoder 810 may generate output tokens 816 until a special [EOT] token (indicating the end of the text) is generated. The resulting sequence of output tokens 816 can then be converted to a text sequence in post-processing. For example, each output token 816 may be an integer number that corresponds to a vocabulary index. By looking up the text segment using the vocabulary index, the text segment corresponding to each output token 816 may be retrieved, the text segments may be concatenated together, and the final output text sequence can be obtained.

In some implementations, the input provided to transformer 812 includes instructions to perform a function on an existing text. The output may include, for example, a modified version of the input text and instructions to modify the text. The modification may include summarizing, translating, correcting grammar or spelling, changing the style of the input text, lengthening or shortening the text, or changing the format of the text (e.g., adding bullet points or checkboxes).

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that may then be further processed by a task-specific layer (e.g., a classification layer). BERT is an example of a language model that may be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models may be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system may access a remote language model (e.g., a cloud-based language model), such as ChatGPT or GPT-3, via a software interface (e.g., an API). Additionally or alternatively, such a remote language model may be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LLM to generate a desired output. A computer system can generate a prompt that is provided as input to the LLM via an API. As described above, the prompt may optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Process 900 of FIG. 9 begins at 902 with receiving a request for executing a computational function at the routing system, where the request comprises function execution instructions and indicators corresponding to request data associated with the computational function. This initial step corresponds to the input processing capabilities described in computing system 600 from FIG. 6, where processors 610a-610n receive and process incoming computational requests through I/O interface 650. The request reception also relates to the prompt processing mechanism illustrated in FIG. 8, where natural language inputs are received by transformer 812 as the starting point for computational processing, similar to how the routing system receives computational function requests as its initial input.

At 904, the routing system detects multiple sets of boundaries within the request data, where each set of boundaries is associated with the computational function being executed. This boundary detection process may utilize the computational capabilities of processors 610a-610n from FIG. 6, which execute program instructions 670 stored in system memory 620 to analyze and identify semantic boundaries within large datasets. The boundary detection mechanism may also use the tokenization process shown in FIG. 8, where input text is parsed into tokens 802.

At 906, the routing system generates multiple data fragments using the detected boundaries, ensuring each fragment minimizes semantic disruption by overlapping with neighboring fragments to maintain contextual continuity. This fragmentation process may leverage the memory management capabilities of system memory 620 in FIG. 6, where large datasets are organized and stored for efficient processing by multiple processors. Fragment generation may also use the embedding creation process in FIG. 8, where tokens 802 are converted into embeddings 806 that preserve semantic relationships, similar to how data fragments maintain semantic coherence through strategic overlapping while enabling distributed processing.

At 908, the routing system generates an execution map for the data fragments, including sub-functions assigned to artificial intelligence agents based on corresponding sub-functions associated with each fragment. This mapping process may utilizes the distributed processing architecture shown in FIG. 6, where multiple processors 610a-610n coordinate to handle different computational tasks simultaneously. The execution mapping may also use encoder 808 functionality in FIG. 8, where input embeddings are processed and transformed into feature vectors 814 that represent different aspects of the input, similar to how the execution map organizes fragments and assigns them to specialized agents based on their processing capabilities.

At 910, the routing system generates dependency graph is generated for the data fragments, indicating the execution order of sub-functions associated with each fragment to ensure proper sequencing and coordination. This dependency analysis may leverage the coordination capabilities of I/O interface 650 from FIG. 6, which manages data flow and timing between different system components to ensure proper execution order. The dependency graph generation decoder 810 which generates output tokens 816 one by one in a specific sequence, demonstrating how computational processes may require careful ordering and dependency management to produce coherent results.

At 912, the routing system transmits the data fragments and corresponding metadata to multiple artificial intelligence agents based on the dependency graph and execution map, where each agent has autonomous execution capabilities. This transmission process may utilizes network inter-face 640 from FIG. 6, which facilitates data exchange between the computer system and connected agents through network communications. At 914, the routing system aggregates and transmits outputs received from the artificial intelligence agents, combining distributed processing results into coherent final outputs. The routing system may use processors 610a-610n to perform this operation.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration, not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

A number of implementations have been described. Nevertheless, it will be understood that various modifications may be made without departing from the spirit and scope of the disclosure. Accordingly, other implementations are within the scope of the following claims.

1. A method comprising: receiving, at a routing system, a request for executing a computational function, wherein the request comprises function execution instructions and one or more indicators corresponding to request data associated with the computational function; detecting a plurality of sets of boundaries within the request data, wherein each set of boundaries of the plurality of sets of boundaries is associated with the computational function; generating, using on the plurality of sets of boundaries, a plurality of data fragments, wherein each data fragment of the plurality of data fragments minimizes semantic disruption for each fragment by overlapping with one or more neighboring fragments; generating, based on the plurality of sets of boundaries, an execution map for the plurality of data fragments, wherein the execution map comprises a plurality of sub-functions assigned to a plurality of artificial intelligence agents, based on a corresponding sub-function associated with each data fragment of the plurality of data fragments; generating, based on the plurality of sets of boundaries and corresponding data fragments, a dependency graph for the plurality of data fragments, wherein the dependency graph indicates execution order of the plurality of sub-functions associated with the plurality of data fragments; transmitting, based on the dependency graph and the execution map, the plurality of data fragments and corresponding metadata to the plurality of artificial intelligence agents, wherein each artificial intelligence agent of the plurality of artificial intelligence agents is associated with a corresponding computer-executable operation set configured to be autonomously executed by a corresponding artificial intelligence agent on a software application set; and aggregating and transmitting a plurality of outputs received from the plurality of artificial intelligence agents.

2. The method of any preceding embodiments, wherein detecting the plurality of sets of boundaries within the request data further comprises: inputting the request data into a topics artificial intelligence model to generate a plurality of topics, wherein the topics artificial intelligence model has been trained, using a training dataset, to predict corresponding topics within data input; and assigning the plurality of topics to the plurality of sets of boundaries.

3. The method of any preceding embodiments, wherein the topics artificial intelligence model has been trained to detect the plurality of sets of boundaries based on content type of each portion of the request data, and wherein the request data comprises a plurality of content types including narrative, technical, or dialogue.

4. The method of any preceding embodiments, further comprising: tracking each topic of the plurality of topics across data fragments for maintaining reference coherence; and overlapping the plurality of topics across the data fragments based on content complexity.

5. The method of any preceding embodiments, further comprising: periodically determining for each artificial intelligence agent of the plurality of artificial intelligence agents a plurality of availability metrics; and modifying fragment size of the plurality of data fragments based on the plurality of availability metrics.

6. The method of any preceding embodiments, wherein generating the dependency graph for the plurality of data fragments further comprises: inputting, the plurality of sub-functions and the corresponding data fragments into a graph generation machine learning model to generate a plurality of execution paths for the plurality of sub-functions, wherein the graph generation machine learning model has been trained, using a training data set to identify parallelizable sub-functions for concurrent execution.

7. The method of any preceding embodiments, further comprising: inputting the plurality of execution paths and the plurality of availability metrics into path optimization machine learning model to generate an optimized path for executing the plurality of sub-functions, wherein the path optimization machine learning model has been trained, using a training dataset, to output an execution path optimized for execution time based on agent availability and sub-function execution reordering.

8. The method of any preceding embodiments, further comprising: determining that the optimized path has one or more artificial intelligence agents that have failed; inputting the plurality of execution paths the plurality of availability metrics, and one or more indications of the one or more artificial intelligence agents that have failed into the path optimization machine learning model, wherein the path optimization machine learning model has been trained to output, based on agent availability, a given execution path optimized for a given execution time; and receiving from the path optimization machine learning model an updated optimized path for executing the plurality of sub-functions avoiding the one or more artificial intelligence agents that have failed.

9. The method of any preceding embodiments, further comprising: receiving, from a first artificial intelligence agent of the plurality of artificial intelligence agents first sub-function completion data associated with a first sub-function of the plurality of sub-functions, wherein the first sub-function is associated with a first topic of a plurality of topics; receiving, from a second artificial intelligence agent of the plurality of artificial intelligence agents second sub-function completion data associated with a second sub-function of the plurality of sub-functions, wherein the second sub-function is associated with the first topic of the plurality of topics; determining that the second sub-function completion data includes newly discovered data related to the first topic; and performing backpropagation of the newly discovered data to influence interpretation of the first sub-function completion data, wherein the backpropagation enables iterative refinement of the first sub-function completion data.

10. One or more tangible, non-transitory, computer-readable media storing instructions that, when executed by a data processing apparatus, cause the data processing apparatus to perform operations comprising those of any of embodiments 1-9.

11. A system comprising: one or more processors; and memory storing instructions that, when executed by the one or more processors, cause the processors to effectuate operations comprising those of any of embodiments 1-9.

12. A system comprising means for performing any of embodiments 1-9.

13. A system comprising cloud-based circuitry for performing any of embodiments 1-9.

What is claimed is:

1. One or more non-transitory computer-readable media storing instructions thereon for dividing computational action requests for different artificial intelligence agents, wherein the instructions cause one or more processors to:

receive, at a routing system, a request for executing a computational function, wherein the request comprises function execution instructions and one or more indicators corresponding to request data associated with the computational function;

detect a plurality of sets of boundaries within the request data, wherein each set of boundaries of the plurality of sets of boundaries is associated with the computational function;

generate, using on the plurality of sets of boundaries, a plurality of data fragments, wherein each data fragment of the plurality of data fragments minimizes semantic disruption for each fragment by overlapping with one or more neighboring fragments, and wherein each data fragment of the plurality of data fragments is a portion of the request data that shares a common content region with one or more adjacent data fragments of the plurality of data fragments;

generate, based on the plurality of sets of boundaries, an execution map for the plurality of data fragments, wherein the execution map comprises a plurality of sub-functions assigned to a plurality of domain-specific artificial intelligence agents, based on a corresponding sub-function associated with each data fragment of the plurality of data fragments, and wherein each domain-specific artificial intelligence agent of the plurality of domain-specific artificial intelligence agents is assigned a different data fragment of the plurality of data fragments;

generate, based on the plurality of sets of boundaries and corresponding data fragments, a dependency graph for the plurality of data fragments, wherein the dependency graph indicates execution order of the plurality of sub-functions associated with the plurality of data fragments; based on one or more relationships between respective topic associated with the plurality of data fragments;

transmit, based on the dependency graph and the execution map, the plurality of data fragments and corresponding metadata to the plurality of domain-specific artificial intelligence agents, wherein each domain-specific artificial intelligence agent of the plurality of domain-specific artificial intelligence agents is associated with a corresponding computer-executable operation set configured to be autonomously executed by a corresponding domain-specific artificial intelligence agent on a software application set; and aggregate and transmit a plurality of outputs received from the plurality of domain-specific artificial intelligence agents.

2. The one or more non-transitory computer-readable media of claim 1, wherein the instructions for detecting the plurality of sets of boundaries within the request data further cause the one or more processors to:

input the request data into a topics artificial intelligence model to generate a plurality of topics, wherein the topics artificial intelligence model has been trained, using a training dataset, to predict corresponding topics within data input; and assign the plurality of topics to the plurality of sets of boundaries.

3. The one or more non-transitory computer-readable media of claim 2, wherein the topics artificial intelligence model has been trained to detect the plurality of sets of boundaries based on content type of each portion of the request data, and wherein the request data comprises a plurality of content types including narrative, technical, or dialogue.

4. The one or more non-transitory computer-readable media of claim 2, wherein the instructions further cause the one or more processors to:

track each topic of the plurality of topics across data fragments for maintaining reference coherence; and overlap the plurality of topics across the data fragments based on content complexity.

5. The one or more non-transitory computer-readable media of claim 1, wherein the instructions further cause the one or more processors to:

periodically determine for each domain-specific artificial intelligence agent of the plurality of domain-specific artificial intelligence agents a plurality of availability metrics; and modify fragment size of the plurality of data fragments based on the plurality of availability metrics.

6. The one or more non-transitory computer-readable media of claim 5, wherein the instructions for generating the dependency graph for the plurality of data fragments further cause the one or more processors to:

input, the plurality of sub-functions and the corresponding data fragments into a graph generation machine learning model to generate a plurality of execution paths for the plurality of sub-functions, wherein the graph generation machine learning model has been trained, using a training data set to identify parallelizable sub-functions for concurrent execution.

7. The one or more non-transitory computer-readable media of claim 6, wherein the instructions further cause the one or more processors to:

inputting the plurality of execution paths and the plurality of availability metrics into path optimization machine learning model to generate an optimized path for executing the plurality of sub-functions, wherein the path optimization machine learning model has been trained, using a training dataset, to output an execution path optimized for execution time based on agent availability and sub-function execution reordering.

8. The one or more non-transitory computer-readable media of claim 7, wherein the instructions further cause the one or more processors to:

determining that the optimized path has one or more domain-specific artificial intelligence agents that have failed;

inputting the plurality of execution paths the plurality of availability metrics, and one or more indications of the one or more domain-specific artificial intelligence agents that have failed into the path optimization machine learning model, wherein the path optimization machine learning model has been trained to output, based on agent availability, a given execution path optimized for a given execution time; and receiving from the path optimization machine learning model an updated optimized path for executing the plurality of sub-functions avoiding the one or more domain-specific artificial intelligence agents that have failed.

9. The one or more non-transitory computer-readable media of claim 5, wherein the instructions further cause the one or more processors to:

receiving, from a first domain-specific artificial intelligence agent of the plurality of domain-specific artificial intelligence agents first sub-function completion data associated with a first sub-function of the plurality of sub-functions, wherein the first sub-function is associated with a first topic of a plurality of topics;

receiving, from a second domain-specific artificial intelligence agent of the plurality of domain-specific artificial intelligence agents second sub-function completion data associated with a second sub-function of the plurality of sub-functions, wherein the second sub-function is associated with the first topic of the plurality of topics;

determining that the second sub-function completion data includes newly discovered data related to the first topic; and performing backpropagation of the newly discovered data to influence interpretation of the first sub-function completion data, wherein the backpropagation enables iterative refinement of the first sub-function completion data.

10. A method for dividing requests for different artificial intelligence agents, the method comprising:

receiving a request for executing an action, wherein the request comprises execution instructions and one or more indicators corresponding to request data associated with the action;

detecting a plurality of sets of boundaries within the request data, wherein each set of boundaries of the plurality of sets of boundaries is associated with the action;

generating, using on the plurality of sets of boundaries, a plurality of data fragments, wherein each data fragment of the plurality of data fragments minimizes semantic disruption for each fragment by overlapping with one or more neighboring fragments;

generating, based on the plurality of sets of boundaries, an execution map for the plurality of data fragments, wherein the execution map comprises a plurality of sub-actions assigned to a plurality of artificial intelligence agents, based on a corresponding sub-action associated with each data fragment of the plurality of data fragments;

wherein each artificial intelligence agent is specialized based on a respective domain;

generating, based on the plurality of sets of boundaries and corresponding data fragments, a dependency graph for the plurality of data fragments, wherein the dependency graph indicates execution order of the plurality of sub-actions associated with the plurality of data fragments;

transmitting, based on the dependency graph and the execution map, the plurality of data fragments and corresponding metadata to the plurality of artificial intelligence agents, wherein each artificial intelligence agent of the plurality of artificial intelligence agents is associated with a corresponding computer-executable operation set configured to be autonomously executed by a corresponding artificial intelligence agent on a software application set; and aggregating and transmit a plurality of outputs received from the plurality of artificial intelligence agents.

11. The method of claim 10, wherein detecting the plurality of sets of boundaries within the request data further comprises:

inputting the request data into a topics artificial intelligence model to generate a plurality of topics, wherein the topics artificial intelligence model has been trained, using a training dataset, to predict corresponding topics within data input; and assigning the plurality of topics to the plurality of sets of boundaries.

12. The method of claim 11, wherein the topics artificial intelligence model has been trained to detect the plurality of sets of boundaries based on content type of each portion of the request data, and wherein the request data comprises a plurality of content types including narrative, technical, or dialogue.

13. The method of claim 11, further comprising:

tracking each topic of the plurality of topics across data fragments for maintaining reference coherence; and overlapping the plurality of topics across the data fragments based on content complexity.

14. The method of claim 10, further comprising:

periodically determining for each artificial intelligence agent of the plurality of artificial intelligence agents a plurality of availability metrics; and modifying fragment size of the plurality of data fragments based on the plurality of availability metrics.

15. The method of claim 14, wherein generating the dependency graph for the plurality of data fragments further comprises:

inputting, the plurality of sub-actions and the corresponding data fragments into a graph generation machine learning model to generate a plurality of execution paths for the plurality of sub-actions, wherein the graph generation machine learning model has been trained, using a training data set to identify parallelizable sub-functions for concurrent execution.

16. The method of claim 15, further comprising:

inputting the plurality of execution paths and the plurality of availability metrics into path optimization machine learning model to generate an optimized path for executing the plurality of sub-actions, wherein the path optimization machine learning model has been trained, using a training dataset, to output an execution path optimized for execution time based on agent availability and sub-action execution reordering.

17. The method of claim 16, further comprising:

determining that the optimized path has one or more artificial intelligence agents that have failed;

inputting the plurality of execution paths the plurality of availability metrics, and one or more indications of the one or more artificial intelligence agents that have failed into the path optimization machine learning model, wherein the path optimization machine learning model has been trained to output, based on agent availability, a given execution path optimized for a given execution time; and receiving from the path optimization machine learning model an updated optimized path for executing the plurality of sub-actions avoiding the one or more artificial intelligence agents that have failed.

18. The method of claim 16, further comprising:

receiving, from a first artificial intelligence agent of the plurality of artificial intelligence agents first sub-action completion data associated with a first sub-action of the plurality of sub-actions, wherein the first sub-action is associated with a first topic of a plurality of topics;

receiving, from a second artificial intelligence agent of the plurality of artificial intelligence agents second sub-action completion data associated with a second sub-action of the plurality of sub-actions, wherein the second sub-action is associated with the first topic of the plurality of topics;

determining that the second sub-action completion data includes newly discovered data related to the first topic; and performing backpropagation of the newly discovered data to influence interpretation of the first sub-action completion data, wherein the backpropagation enables iterative refinement of the first sub-action completion data.

19. A system comprising:

one or more processors; and one or more memories storing instructions that when executed by the one or more processors cause the one or more processors to:

receive a request for executing a task, wherein the request is associated with task execution instructions and one or more indicators corresponding to request data associated with the task;

detect a plurality of sets of boundaries within the request data, wherein each set of boundaries of the plurality of sets of boundaries is associated with the task;

generate, using on the plurality of sets of boundaries, a plurality of data fragments, wherein each data fragment of the plurality of data fragments minimizes semantic disruption for each fragment by overlapping with one or more neighboring fragments, and wherein each data fragment of the plurality of data fragments is a portion of the request data that shares a common content region with one or more adjacent data fragments of the plurality of data fragments;

generate, based on the plurality of sets of boundaries, an execution map for the plurality of data fragments, wherein the execution map comprises a plurality of sub-tasks assigned to a plurality of artificial intelligence agents, based on a corresponding sub-task associated with each data fragment of the plurality of data fragments, wherein each artificial intelligence agent is specialized based on a respective domain;

generate, based on the plurality of sets of boundaries and corresponding data fragments, a dependency graph for the plurality of data fragments, wherein the dependency graph indicates execution order of the plurality of sub-tasks associated with the plurality of data fragments;

transmit, based on the dependency graph and the execution map, the plurality of data fragments and corresponding metadata to the plurality of artificial intelligence agents, wherein each artificial intelligence agent of the plurality of artificial intelligence agents is associated with a corresponding computer-executable operation set configured to be autonomously executed by a corresponding artificial intelligence agent on a software application set; and aggregate and transmit a plurality of outputs received from the plurality of artificial intelligence agents.

20. The system of claim 19, wherein the instructions for detecting the plurality of sets of boundaries within the request data further cause the one or more processors to:

input the request data into a topics artificial intelligence model to generate a plurality of topics, wherein the topics artificial intelligence model has been trained, using a training dataset, to predict corresponding topics within data input; and assign the plurality of topics to the plurality of sets of boundaries.

\*   \*   \*   \*   \*